US007016742B2

(12) United States Patent
Jarrell et al.

(10) Patent No.: US 7,016,742 B2
(45) Date of Patent: Mar. 21, 2006

(54) DECISION SUPPORT FOR OPERATIONS AND MAINTENANCE (DSOM) SYSTEM

(75) Inventors: Donald B. Jarrell, Kennewick, WA (US); Richard J. Meador, Richland, WA (US); Daniel R. Sisk, Richland, WA (US); Darrel D. Hatley, Kennewick, WA (US); Daryl R. Brown, Richland, WA (US); Gary R. Keibel, Richland, WA (US); Krishnan Gowri, Richland, WA (US); Jorge F. Reyes-Spindola, Richland, WA (US); Kevin J. Adams, San Bruno, CA (US); Kenneth R. Yates, Lake Oswego, OR (US); Elizabeth J. Eschbach, Fort Collins, CO (US); Rex C. Stratton, Richland, WA (US)

(73) Assignee: BaHelle Memorial Institute, Richland, WA (US)

( * ) Notice: Subject to any disclaimer, the term of this patent is extended or adjusted under 35 U.S.C. 154(b) by 226 days.

(21) Appl. No.: 10/306,943

(22) Filed: Nov. 27, 2002

(65) Prior Publication Data

US 2004/0102924 A1    May 27, 2004

(51) Int. Cl.
*G05B 13/02*    (2006.01)
(52) U.S. Cl. ...................................... 700/28
(58) Field of Classification Search ............... 700/21, 700/32, 36, 79, 108, 109, 110, 11, 143, 174, 700/204, 286, 291, 28, 111, 173
See application file for complete search history.

(56) References Cited

U.S. PATENT DOCUMENTS 4,296,727 A * 10/1981 Bryan ..................... 126/116 A

| 4,613,952 A | 9/1986 | McClanahan |
| 4,676,734 A | 6/1987 | Foley |
| 4,921,163 A | 5/1990 | Viessmann |
| 5,053,978 A | 10/1991 | Solomon |
| 5,061,916 A | 10/1991 | French et al. |
| 5,103,391 A | 4/1992 | Barrett |

(Continued)

FOREIGN PATENT DOCUMENTS

JP    409022432 A  *  1/1997

(Continued)

OTHER PUBLICATIONS

"The effects of root-cause analysis on the utility resource balance", Jarrell et al., Proceedings of Reliability and Maintainability Symposium, Jan. 21-23, 1992, pps. 171-176.*

(Continued)

*Primary Examiner*—Anthony Knight
*Assistant Examiner*—Michael B. Holmes
(74) *Attorney, Agent, or Firm*—Douglas E. McKinley, Jr.

(57) ABSTRACT

A method for minimizing the life cycle cost of processes such as heating a building. The method utilizes sensors to monitor various pieces of equipment used in the process, for example, boilers, turbines, and the like. The method then performs the steps of identifying a set optimal operating conditions for the process, identifying and measuring parameters necessary to characterize the actual operating condition of the process, validating data generated by measuring those parameters, characterizing the actual condition of the process, identifying an optimal condition corresponding to the actual condition, comparing said optimal condition with the actual condition and identifying variances between the two, and drawing from a set of pre-defined algorithms created using best engineering practices, an explanation of at least one likely source and at least one recommended remedial action for selected variances, and providing said explanation as an output to at least one user.

19 Claims, 27 Drawing Sheets

Operations and Maintenance Functional Interactions

U.S. PATENT DOCUMENTS

| | | | |
|---|---|---|---|
| 5,159,562 A | | 10/1992 | Putman et al. |
| 5,172,654 A | | 12/1992 | Christiansen |
| 5,210,704 A | * | 5/1993 | Husseiny .................... 702/34 |
| 5,216,623 A | | 6/1993 | Barrett et al. |
| 5,244,146 A | | 9/1993 | Jefferson et al. |
| 5,521,814 A | * | 5/1996 | Teran et al. ................ 700/266 |
| 5,528,215 A | | 6/1996 | Siu et al. |
| 5,566,092 A | * | 10/1996 | Wang et al. ................ 702/185 |
| 5,572,438 A | | 11/1996 | Ehlers et al. |
| 5,581,459 A | * | 12/1996 | Enbutsu et al. .............. 700/32 |
| 5,676,177 A | * | 10/1997 | Shofner et al. ............ 139/1 C |
| 5,692,676 A | | 12/1997 | Walker |
| 5,754,424 A | | 5/1998 | Melvin |
| 5,794,446 A | | 8/1998 | Earley et al. |
| 5,801,940 A | | 9/1998 | Russ et al. |
| 5,812,061 A | | 9/1998 | Simons |
| 5,841,652 A | | 11/1998 | Sanchez |
| 5,924,486 A | | 7/1999 | Ehlers et al. |
| 5,953,227 A | * | 9/1999 | March et al. ................. 700/36 |
| 6,028,998 A | | 2/2000 | Gloudeman et al. |
| 6,038,540 A | * | 3/2000 | Krist et al. .................... 705/8 |
| 6,067,477 A | | 5/2000 | Wewalaarachchi et al. |
| 6,088,688 A | | 7/2000 | Crooks et al. |
| 6,119,125 A | | 9/2000 | Gloudeman et al. |
| 6,129,284 A | | 10/2000 | Adams et al. |
| 6,134,511 A | | 10/2000 | Subbarao |
| 6,141,595 A | | 10/2000 | Gloudeman et al. |
| 6,144,993 A | | 11/2000 | Fukunaga et al. |
| 6,154,681 A | | 11/2000 | Drees et al. |
| 6,167,316 A | | 12/2000 | Gloudeman et al. |
| 6,173,246 B1 | | 1/2001 | Billups, III |
| 6,192,282 B1 | | 2/2001 | Smith et al. |
| 6,216,956 B1 | | 4/2001 | Ehlers et al. |
| 6,263,260 B1 | | 7/2001 | Bodmer et al. |
| 6,278,899 B1 | | 8/2001 | Piche et al. |
| 6,289,266 B1 | | 9/2001 | Payson et al. |
| 6,314,413 B1 | | 11/2001 | Otte |
| 6,317,638 B1 | | 11/2001 | Schreder et al. |
| 6,330,806 B1 | | 12/2001 | Beaverson et al. |
| 6,348,867 B1 | | 2/2002 | Myllymaki |
| 6,353,853 B1 | | 3/2002 | Gravlin |
| 6,366,889 B1 | | 4/2002 | Zaloom |
| 6,381,504 B1 | | 4/2002 | Havener et al. |
| 6,400,103 B1 | | 6/2002 | Adamson |
| 6,409,090 B1 | | 6/2002 | Gilvar et al. |
| 6,437,692 B1 | | 8/2002 | Petite et al. |
| 6,505,145 B1 | * | 1/2003 | Bjornson .................... 702/185 |
| 6,539,271 B1 | * | 3/2003 | Lech et al. ................. 700/108 |
| 6,577,916 B1 | * | 6/2003 | Gehr et al. ................. 700/129 |
| 6,591,225 B1 | * | 7/2003 | Adelman et al. ........... 702/182 |
| 6,708,155 B1 | * | 3/2004 | Honarvar et al. .............. 705/7 |
| 6,721,606 B1 | * | 4/2004 | Kaji et al. .................... 700/17 |
| 6,728,660 B1 | * | 4/2004 | Bjornson .................... 702/185 |
| 6,754,673 B1 | * | 6/2004 | Horn et al. ............... 707/104.1 |
| 6,804,570 B1 | * | 10/2004 | Kirshenbaum ............... 700/110 |
| 2001/0053940 A1 | * | 12/2001 | Horn et al. .................... 700/32 |
| 2002/0116079 A1 | * | 8/2002 | Kern et al. .................... 700/32 |
| 2002/0128731 A1 | * | 9/2002 | Wegerich et al. ............. 700/31 |
| 2003/0004765 A1 | * | 1/2003 | Wiegand ........................ 705/7 |
| 2003/0061004 A1 | * | 3/2003 | Discenzo .................... 702/182 |
| 2003/0083757 A1 | * | 5/2003 | Card et al. .................... 700/28 |
| 2003/0144746 A1 | * | 7/2003 | Hsiung et al. ................ 700/28 |
| 2004/0030419 A1 | * | 2/2004 | Miyasaka et al. ............. 700/32 |

FOREIGN PATENT DOCUMENTS

| | | | | |
|---|---|---|---|---|
| JP | 409034946 A | * | 2/1997 | |
| JP | 02001357112 A | * | 12/2001 | |
| JP | 02002236736 A | * | 8/2002 | |

OTHER PUBLICATIONS

"An integrated approach to reliability assessment, maintenance and life cycle costs in the National Grid Company", Allison et al., Second International Conference on the Reliability of Transmission and Distribution Equipment, Mar. 29-31, 1995, pps. 180-185.*

"A model-based engineering process for increasing productivity in discrete manufacturing", Long et al., Proceedings, International Conference and Workshop on Engineering of Computer-Based Systems, Mar. 24-28, 1997, pps. 197-202.*

"Reliability Centered Maintenance: A Solution To Optimise Mass Transit System Cost Effectiveness", D'Addio et al., International Conference on Developments in Mass Transit Systems, Apr. 20-23, 1998, pps. 211-216.*

"Maintenance work scheduling aid for nuclear power plants", Kasahara et al., Proceedings of the International Workshop on Artificial Intelligence for Industrial Applications, May 25-27, 1988, pps. 161-166.*

"Designing risk-management strategies for critical engineering systems", Baron et al., IEEE Transactions on Engineering Management, Feb. 1999, vol. 1, No. 1, pps. 87-100.*

"An integrated approach to machine fault diagnosis", Wang et al., IEEE Annual Textile, Fiber and Film Industry Technical Conference, May 4-6, 1999,pps. 1-7.*

"Model predictive control and the optimization of power plant load while considering lifetime consumption", Gallestey et al., IEEE Transactions on Power Systems, Feb. 2002, vol. 17, No. 1, pps. 186-191.*

Contract between assignee, Battelle Memorial Institute and the New York City Housing Authority entered into on or about Oct. 13, 1999.

* cited by examiner

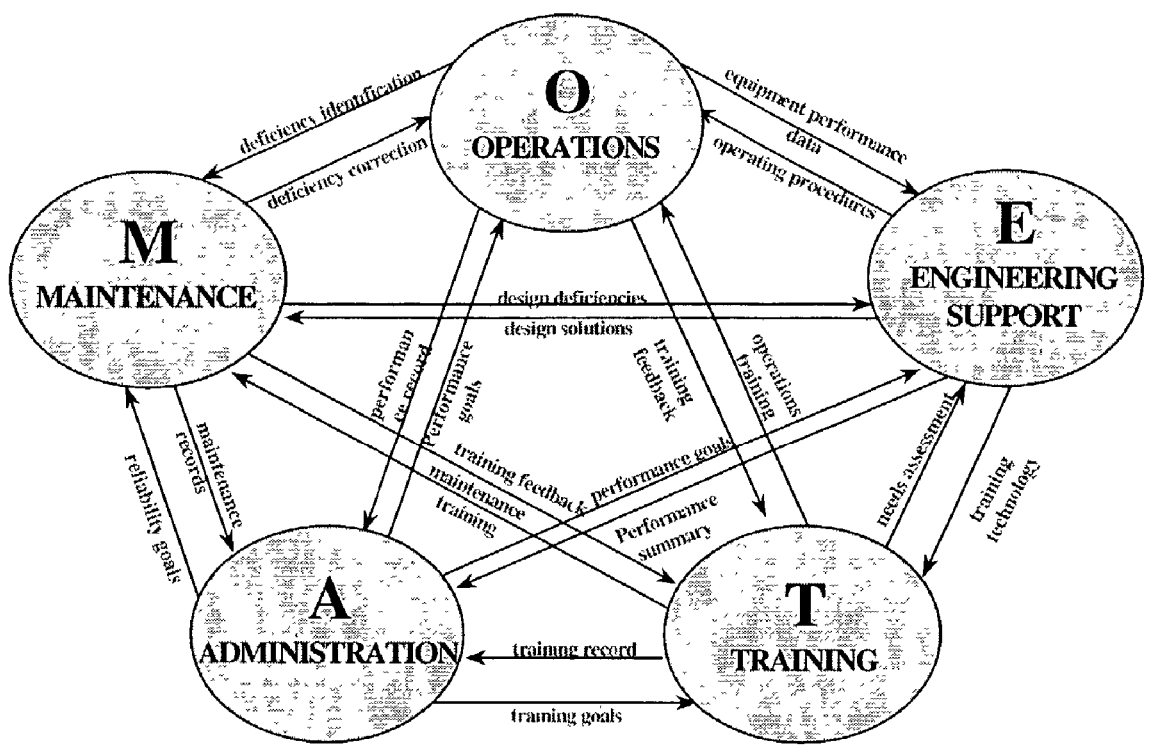
Figure 1. Operations and Maintenance Functional Interactions

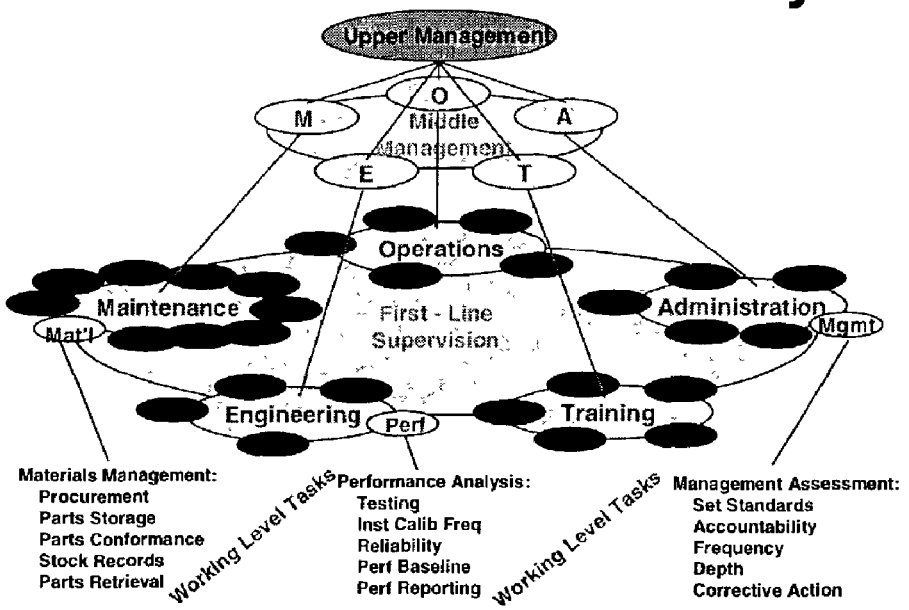
Figure 2. Function Tree Demonstrating Additional Task Levels

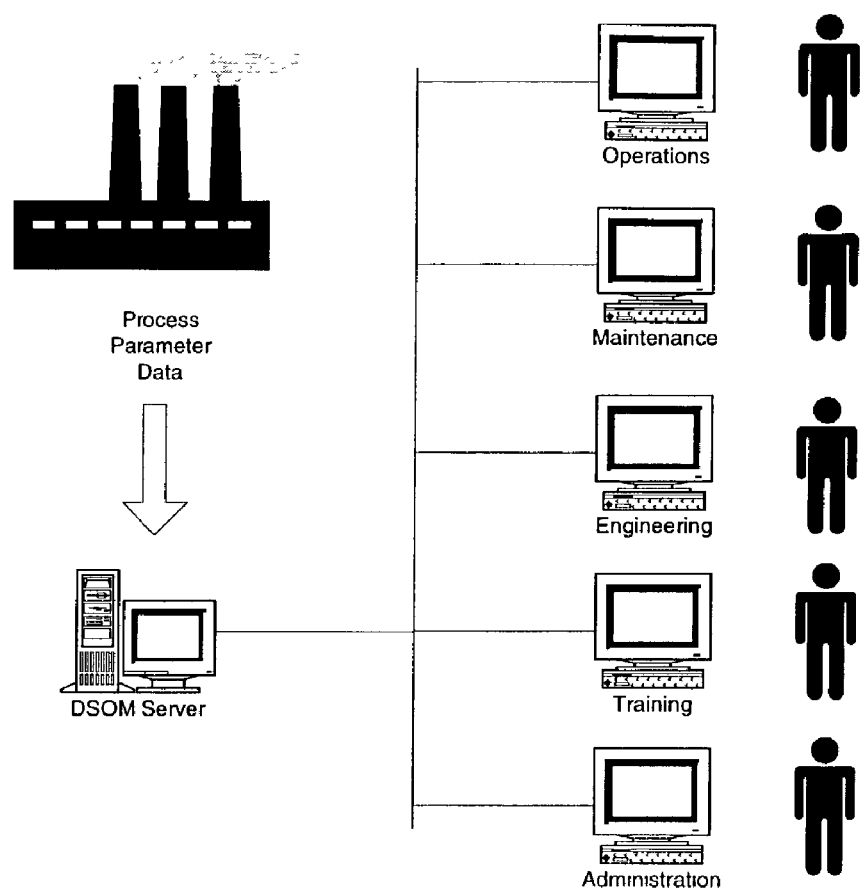
Figure 3. System Overview

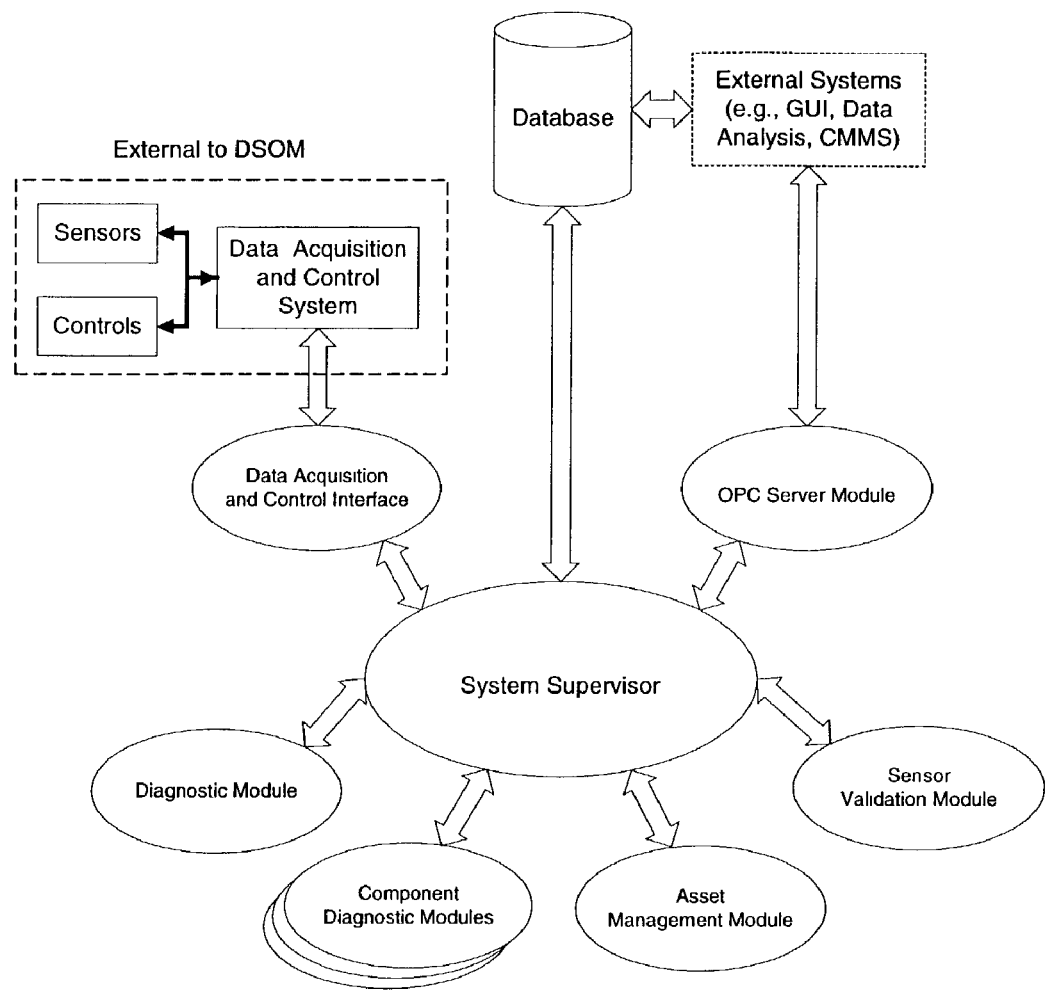
Figure 4. DSOM Architecture

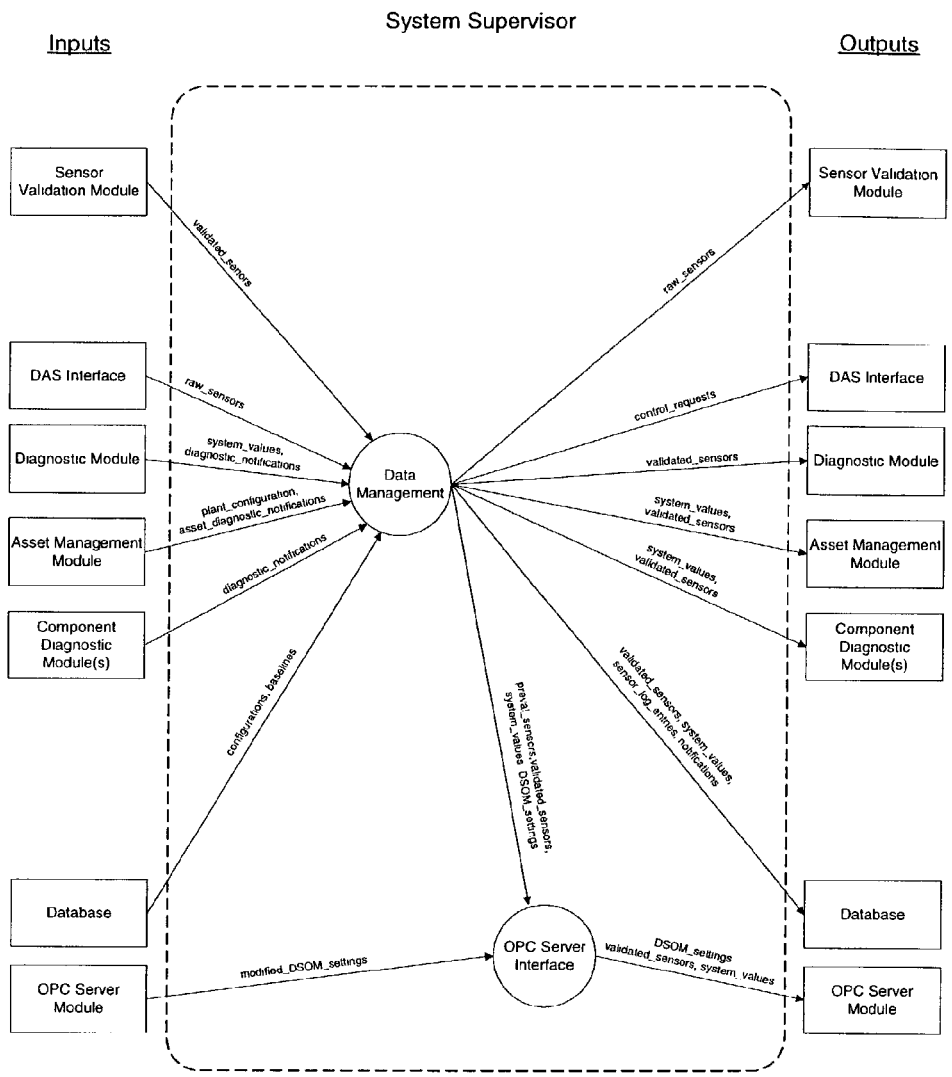
Figure 5. System Supervisor Data Flow

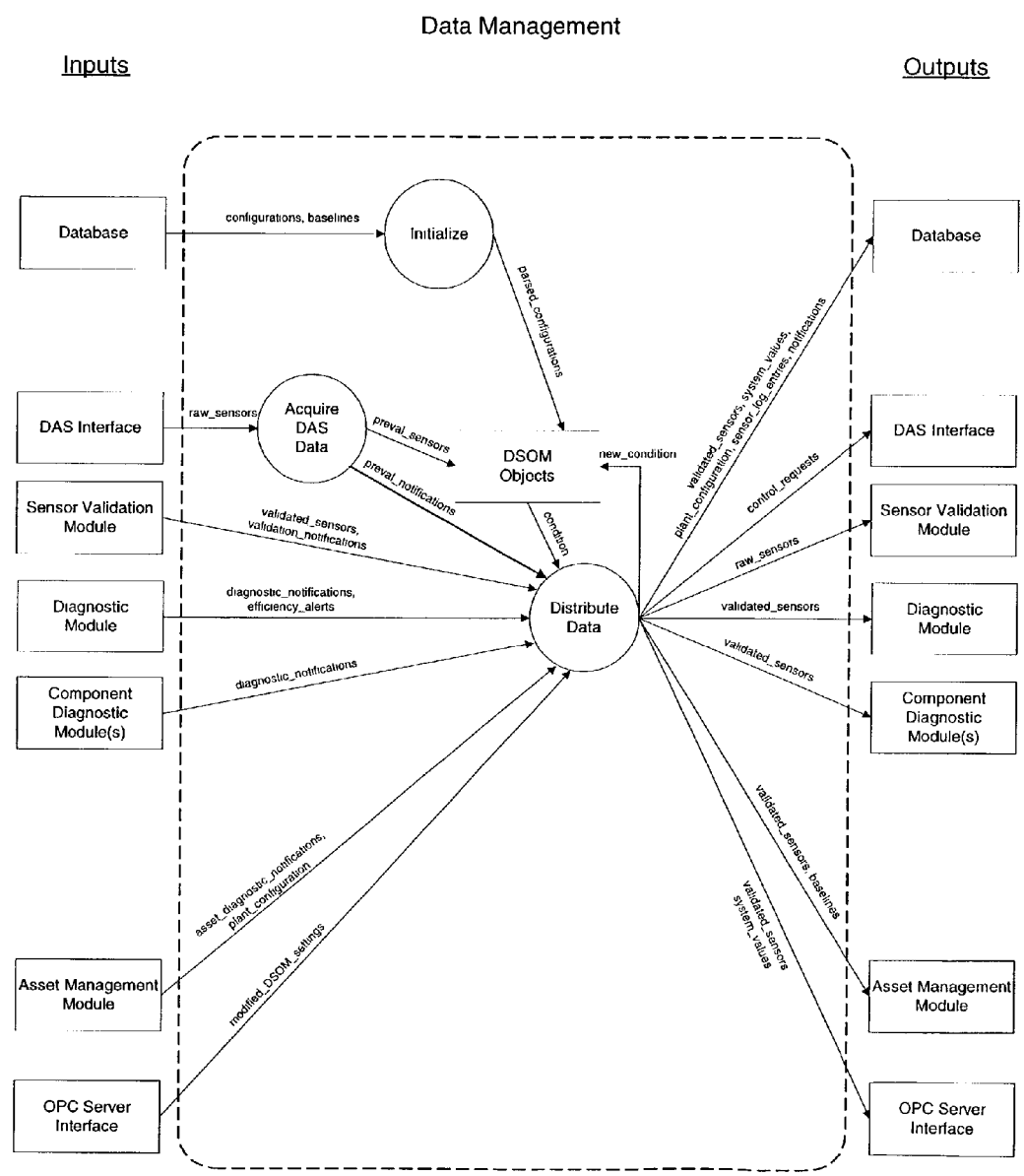
Figure 6. System Supervisor Data Management Function Data Flow

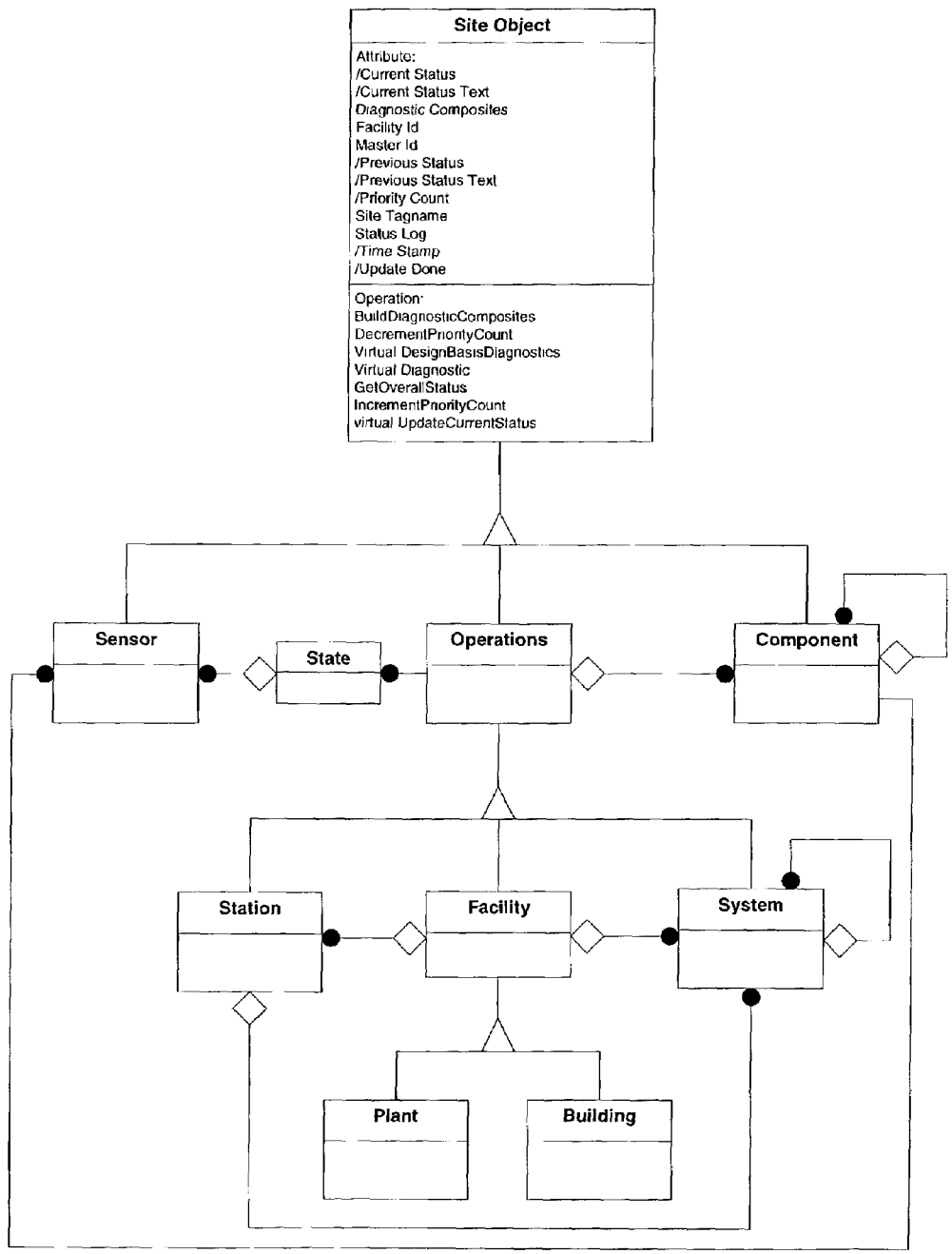
Figure 7. DSOM Object Model

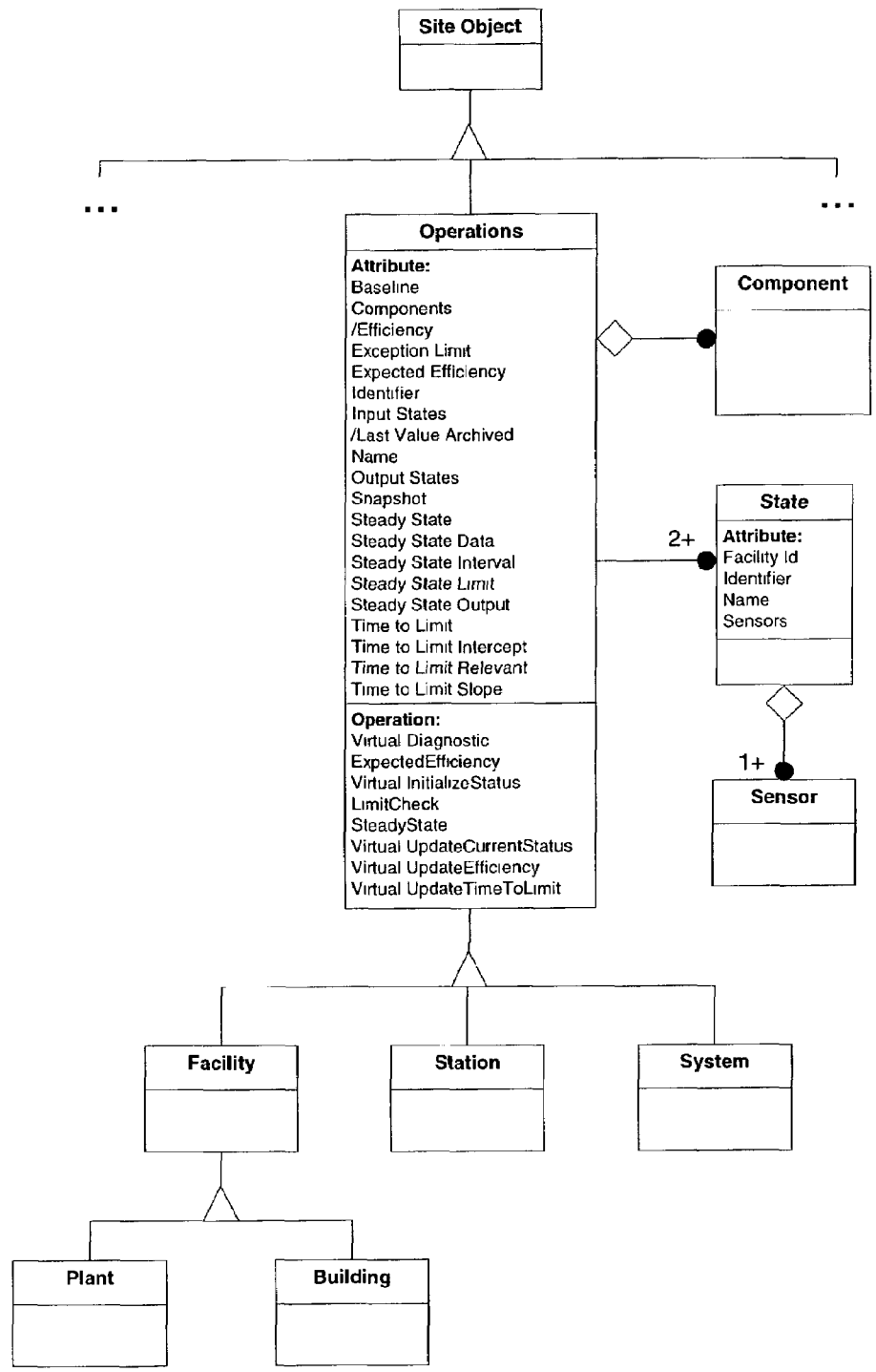
Figure 8a. Operations Object Model

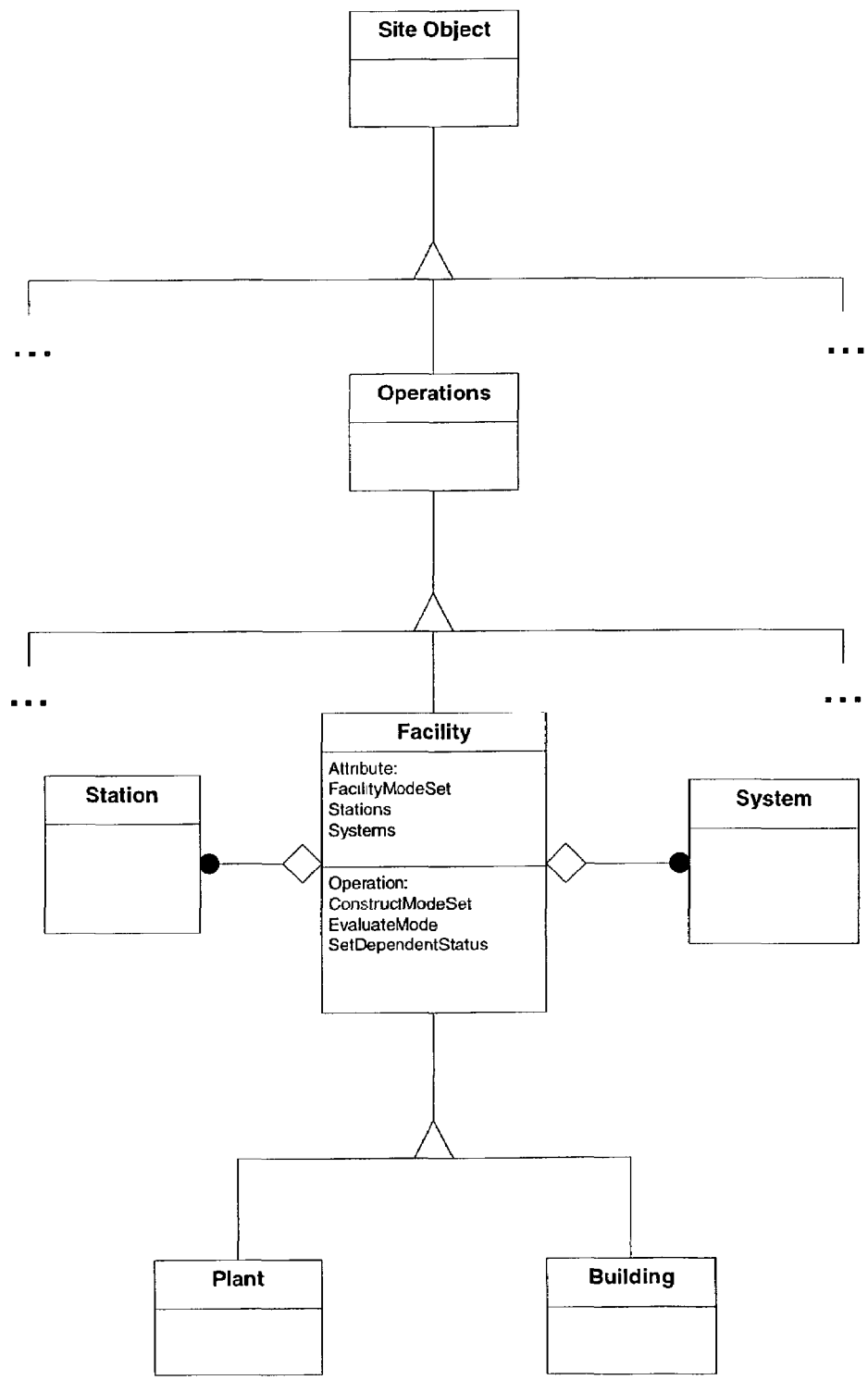
Figure 8b. Operations Object Model (continued)

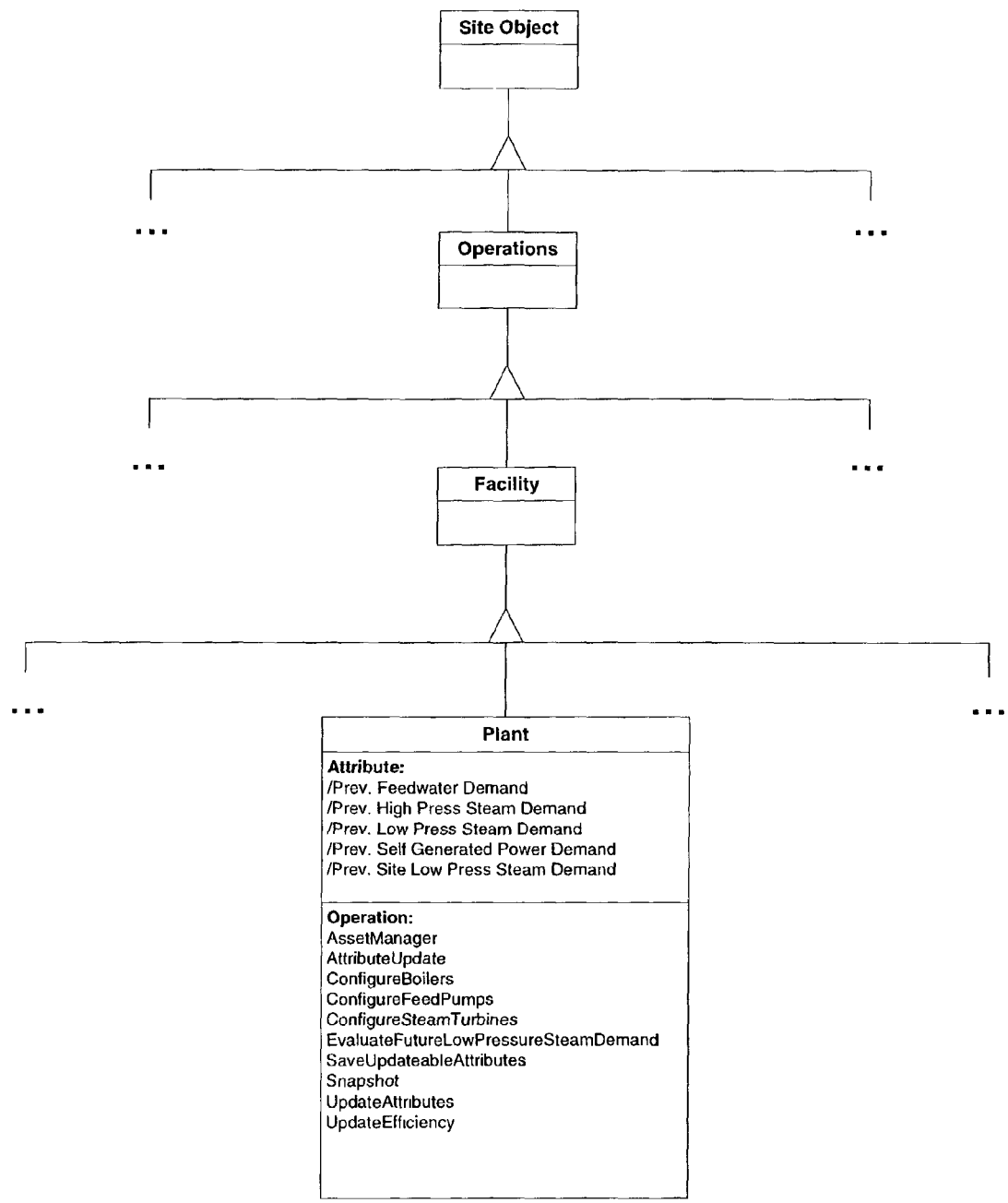
Figure 8c. Operations Object Model (continued)

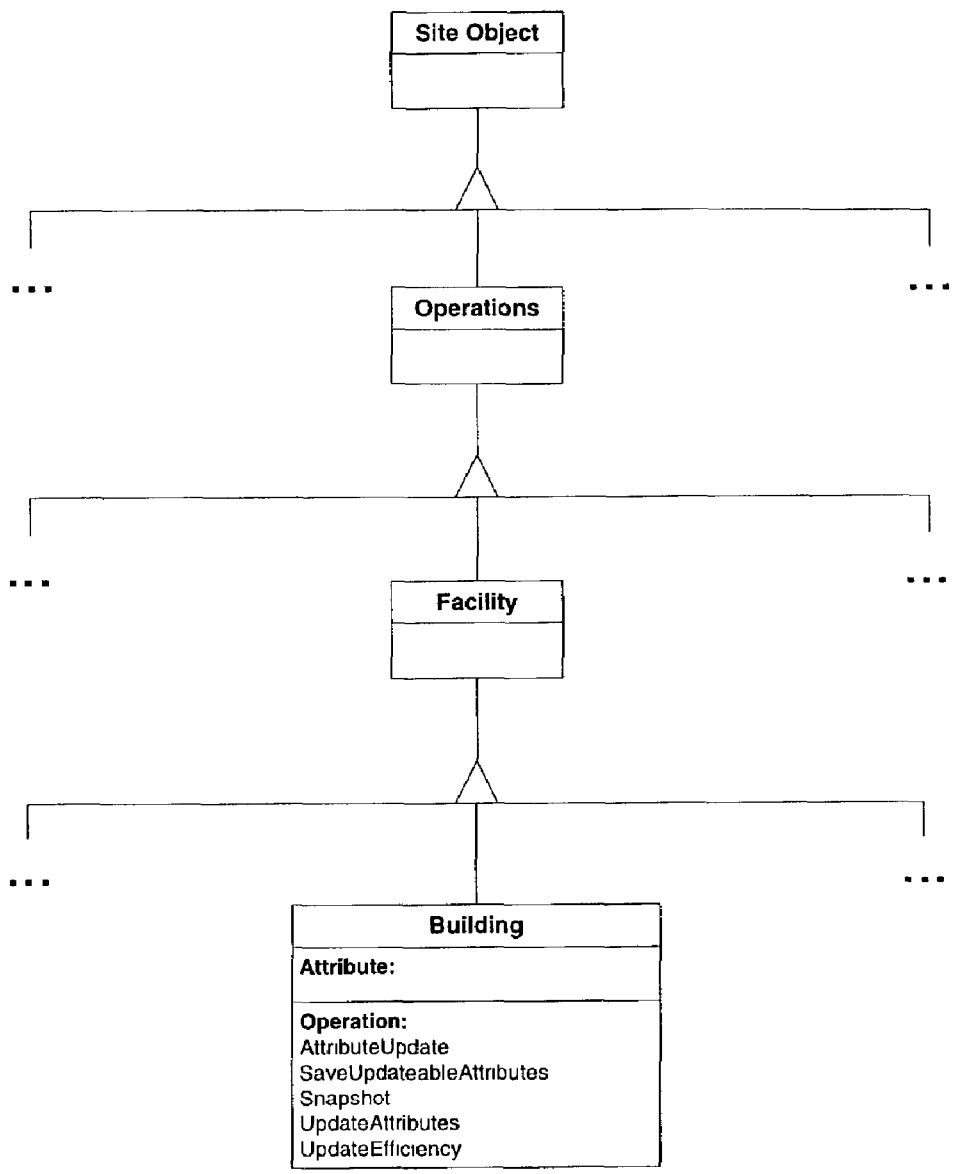
Figure 8d. Operations Object Model (continued)

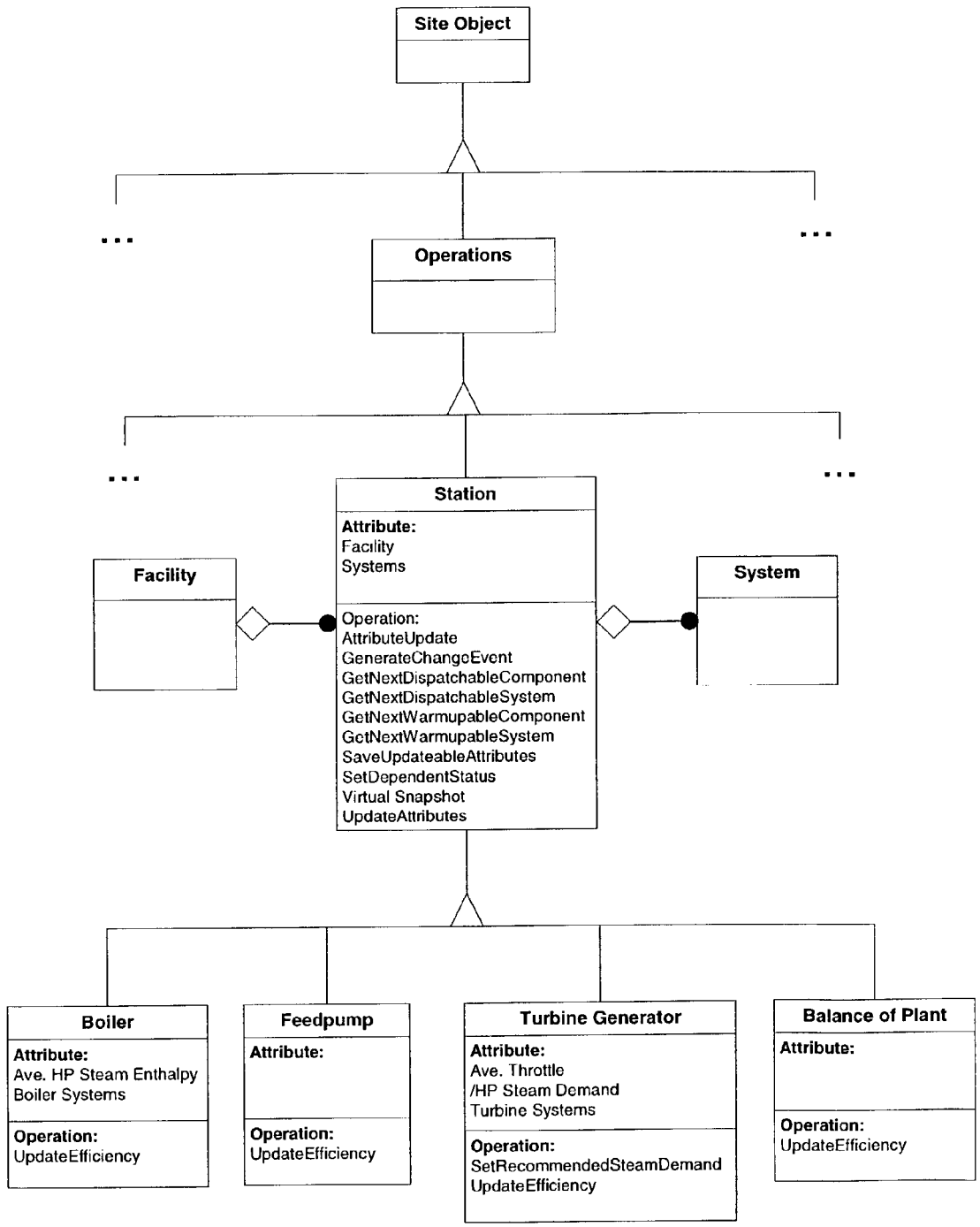
Figure 8e. Operations Object Model (continued)

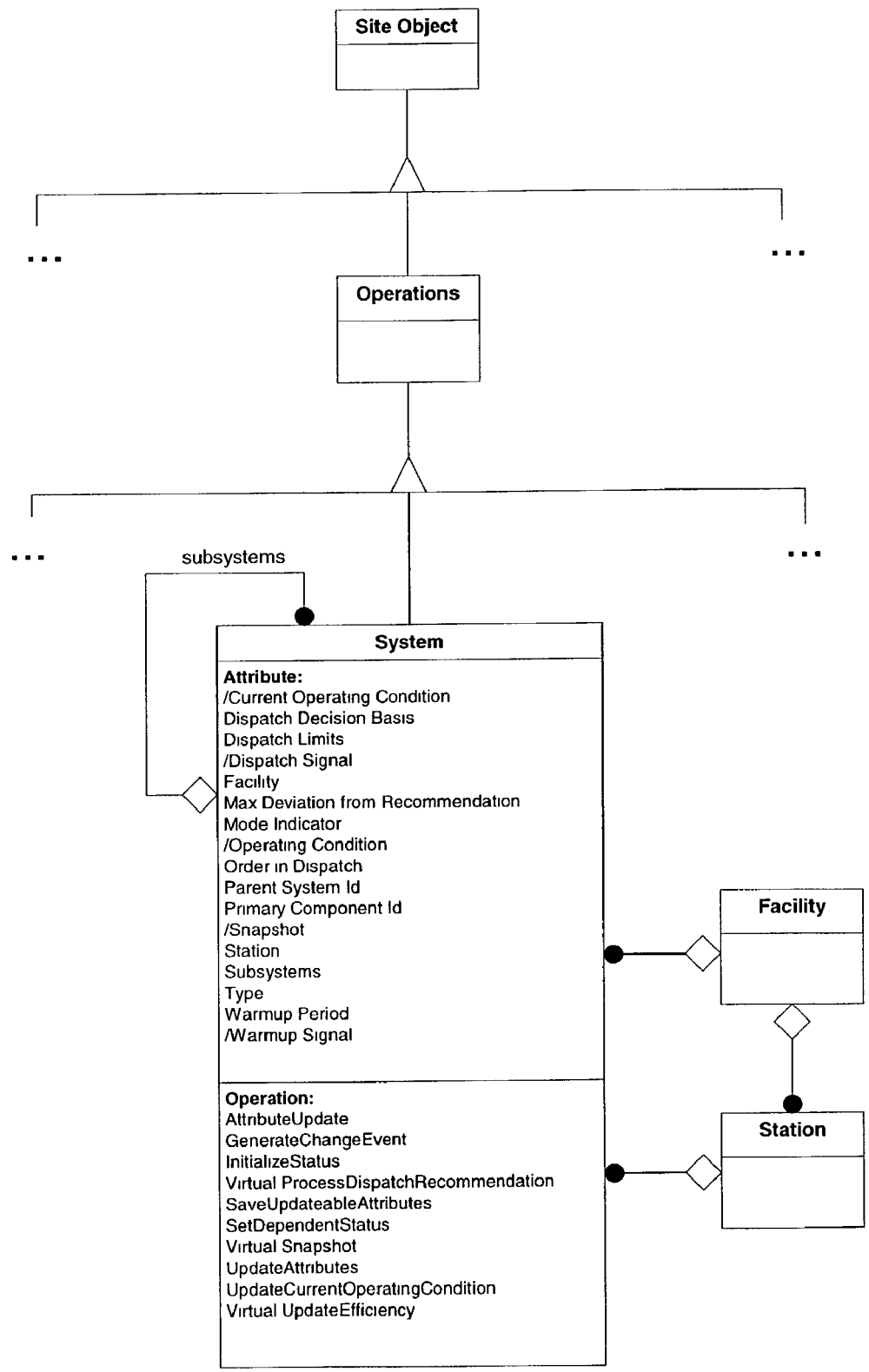
Figure 8f. Operations Object Model (continued)

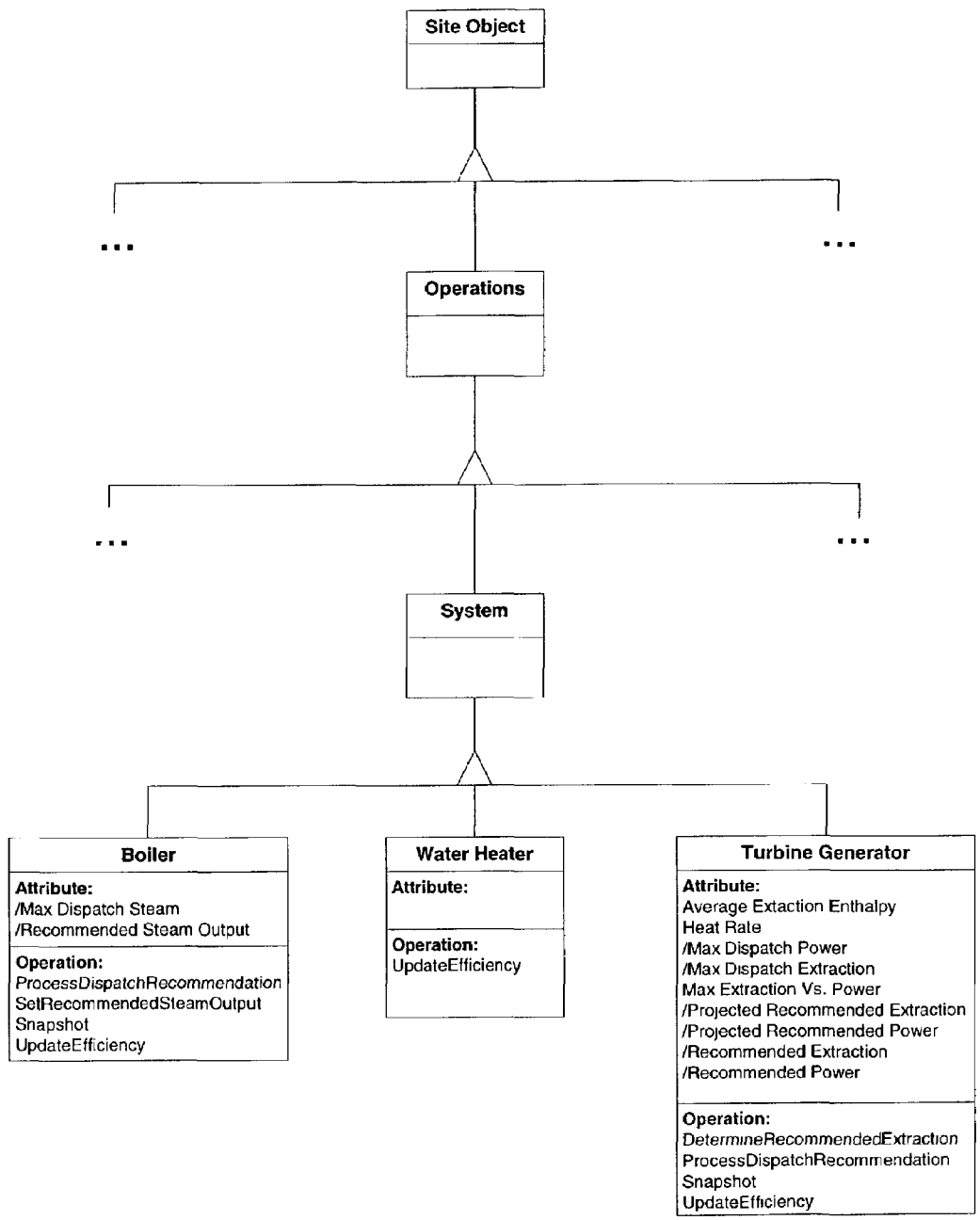
Figure 8g. Operations Object Model (continued)

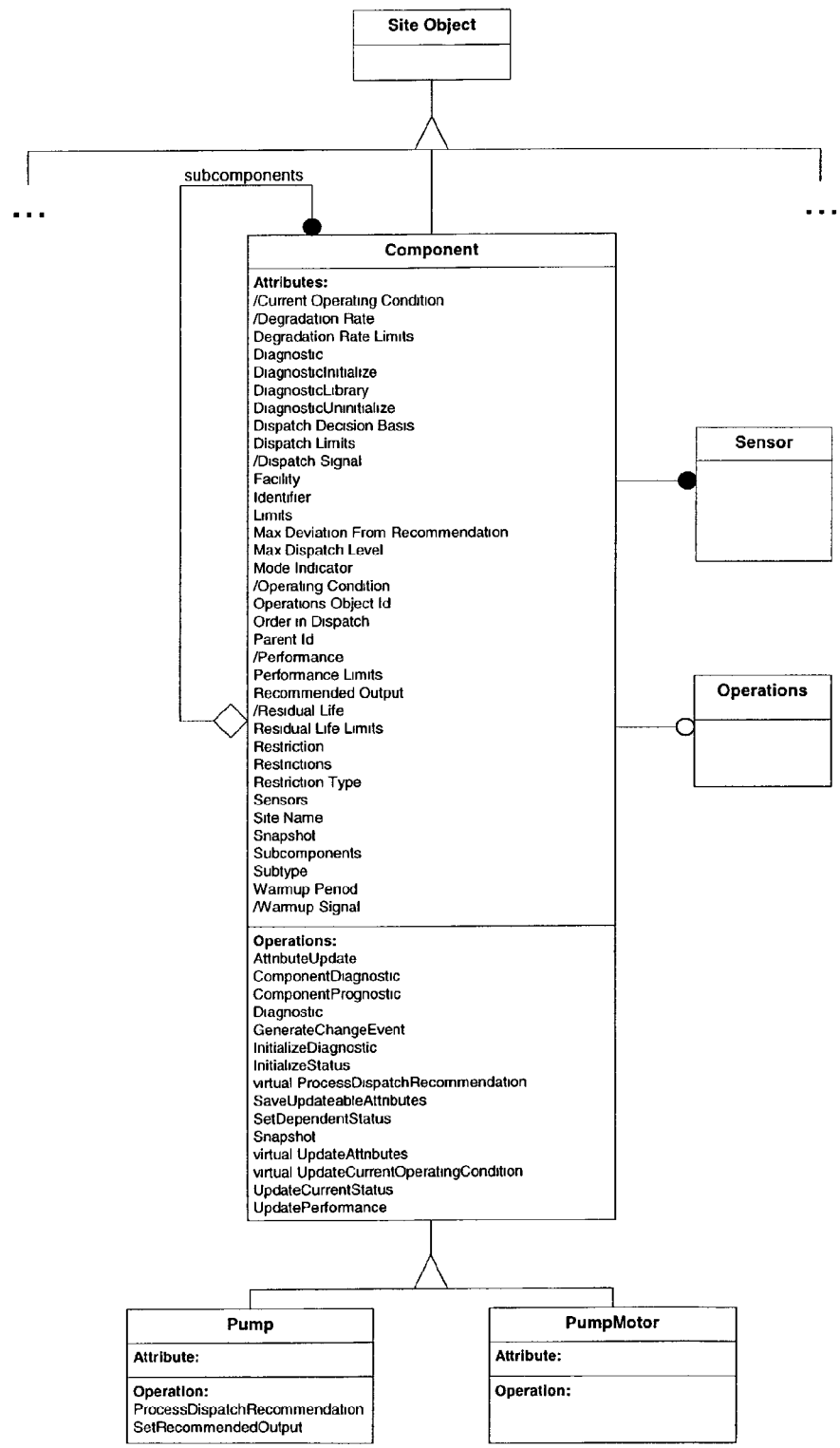
Figure 9. Component Class

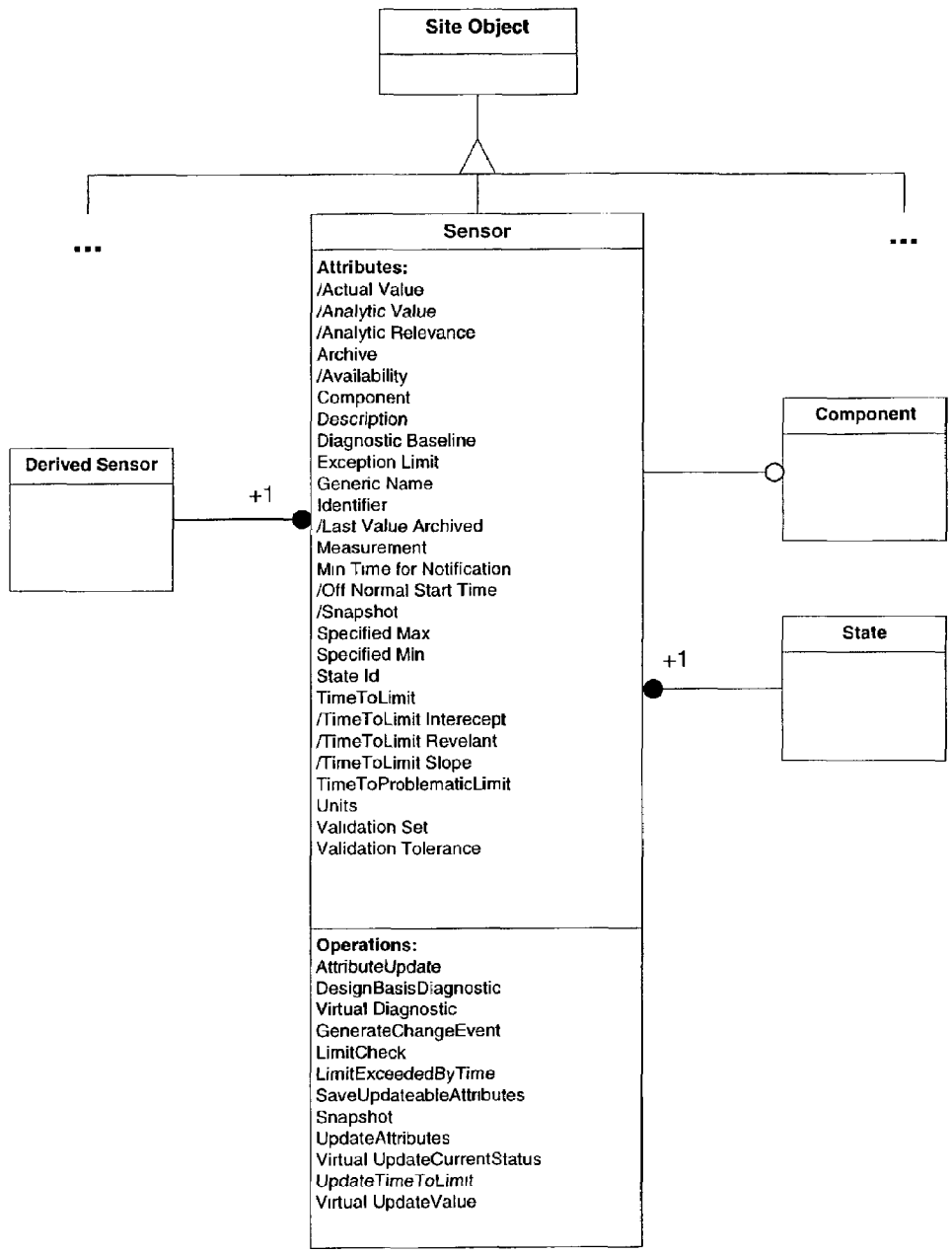
Figure 10a. Object Model for Sensors

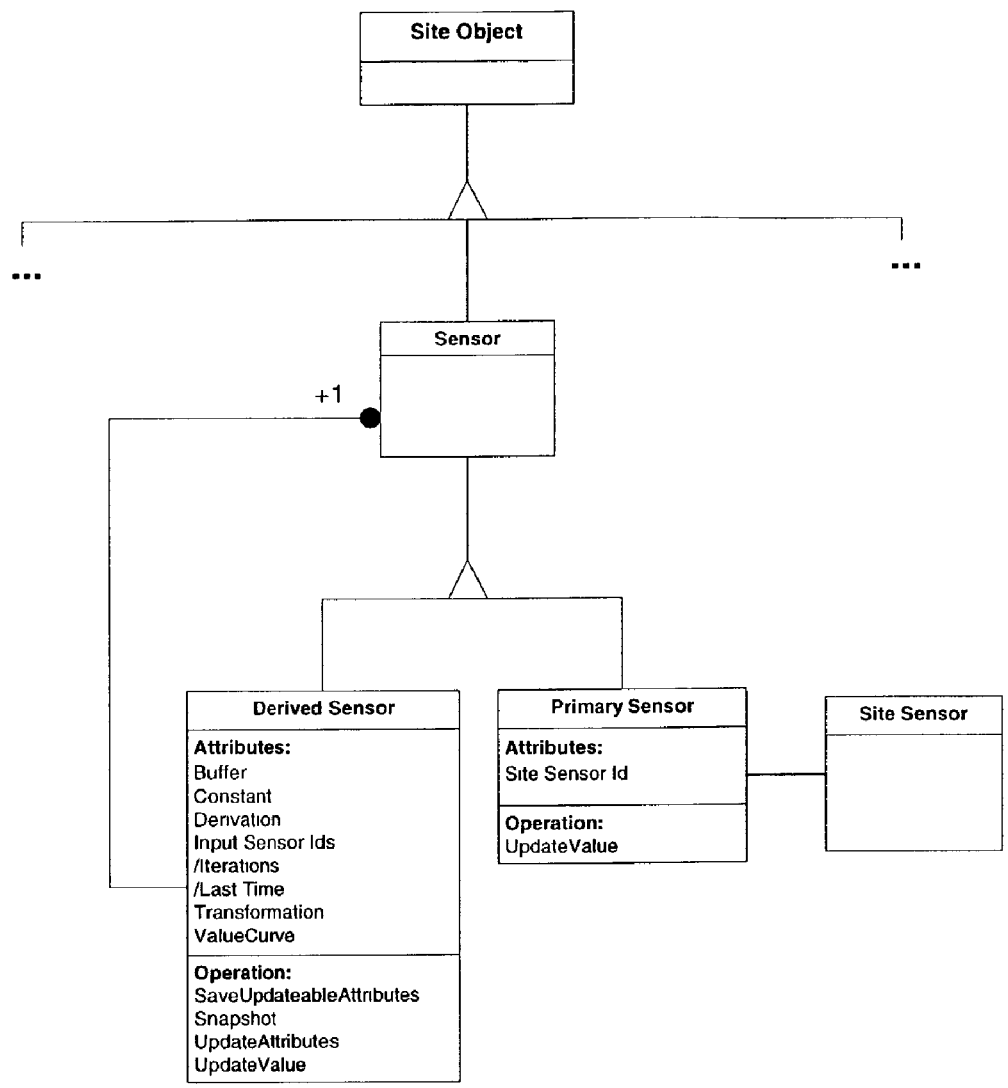
Figure 10b. Object Model for Sensors (continued)

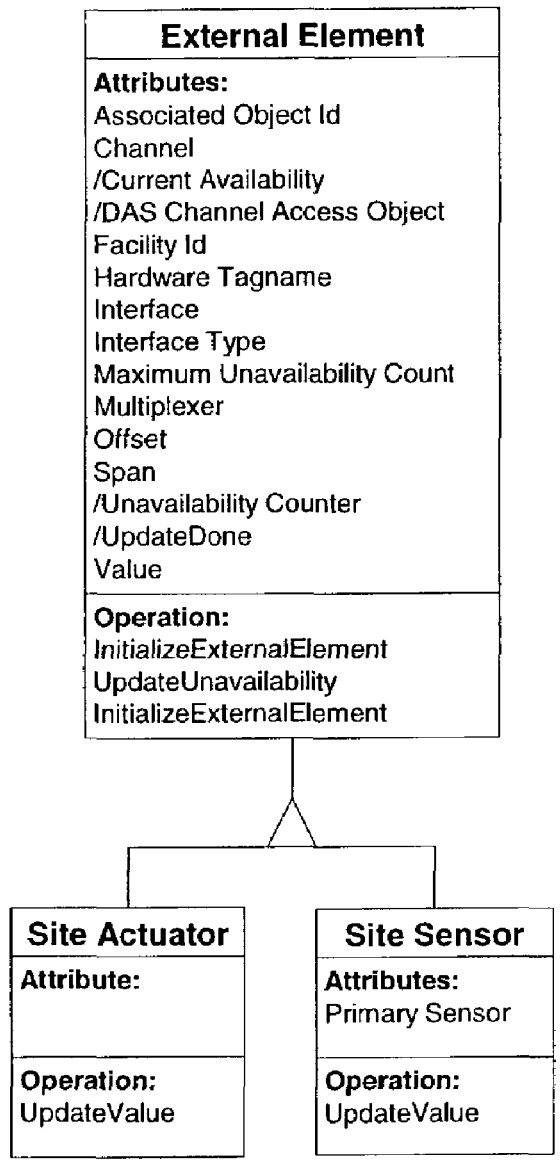
Figure 11. Object Model for External Sensors and Actuators

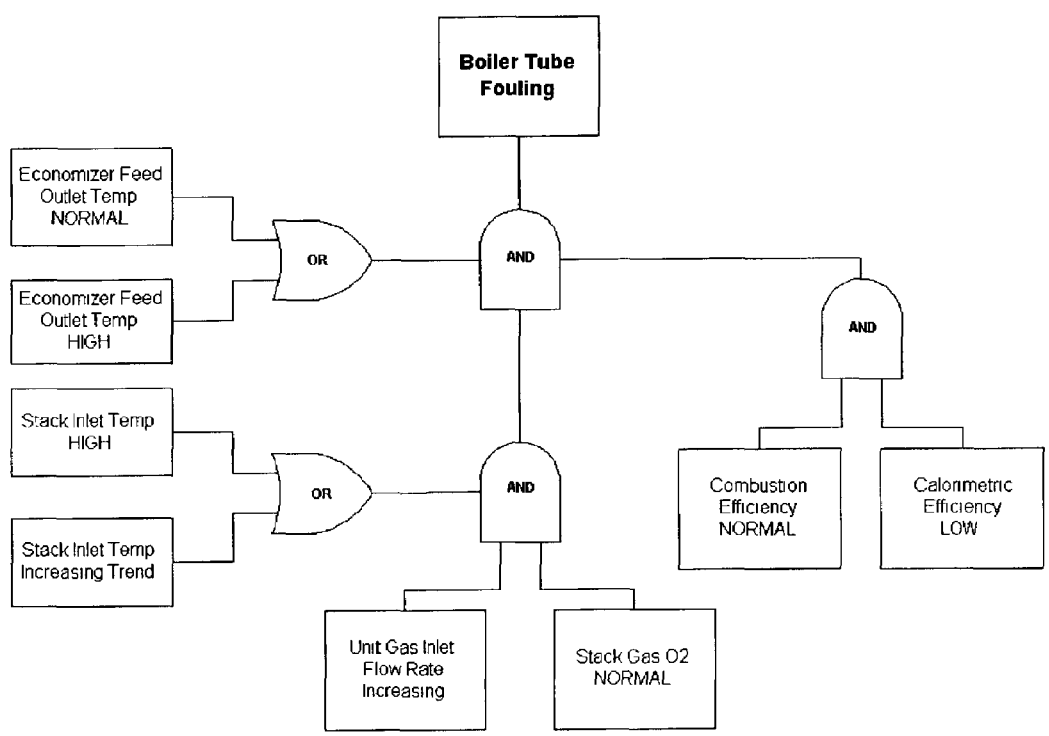
Figure 12a. Example Design-Basis Diagnostic

Figure 12b. Example Design-Basis Diagnostic
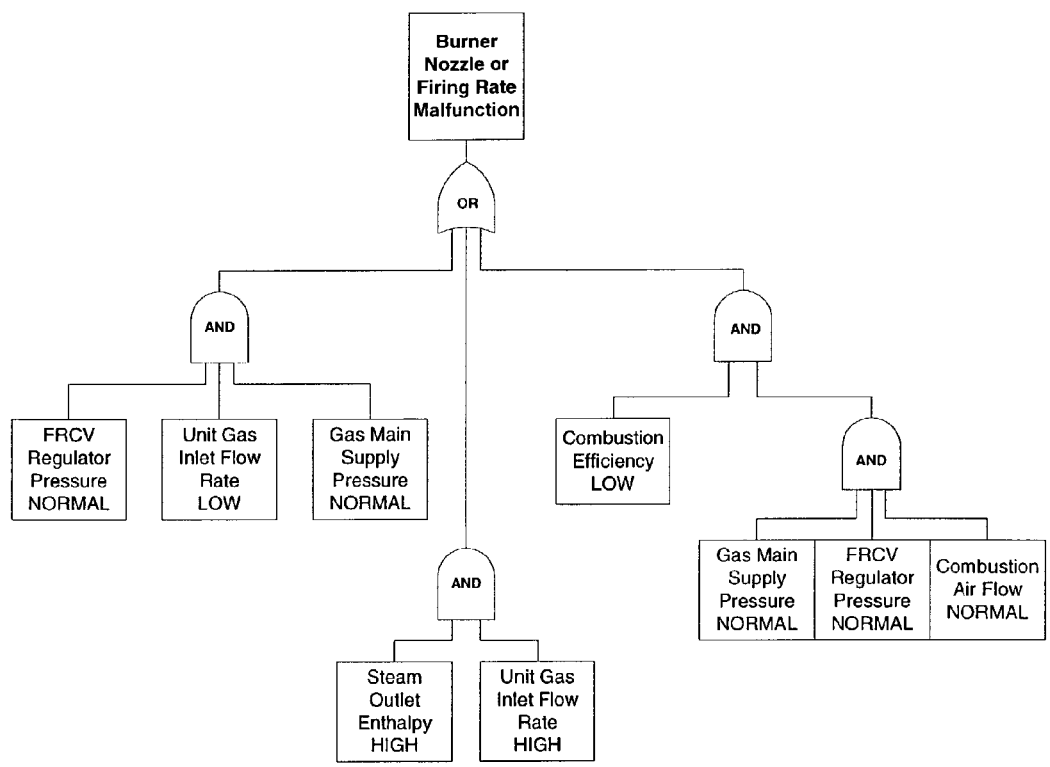

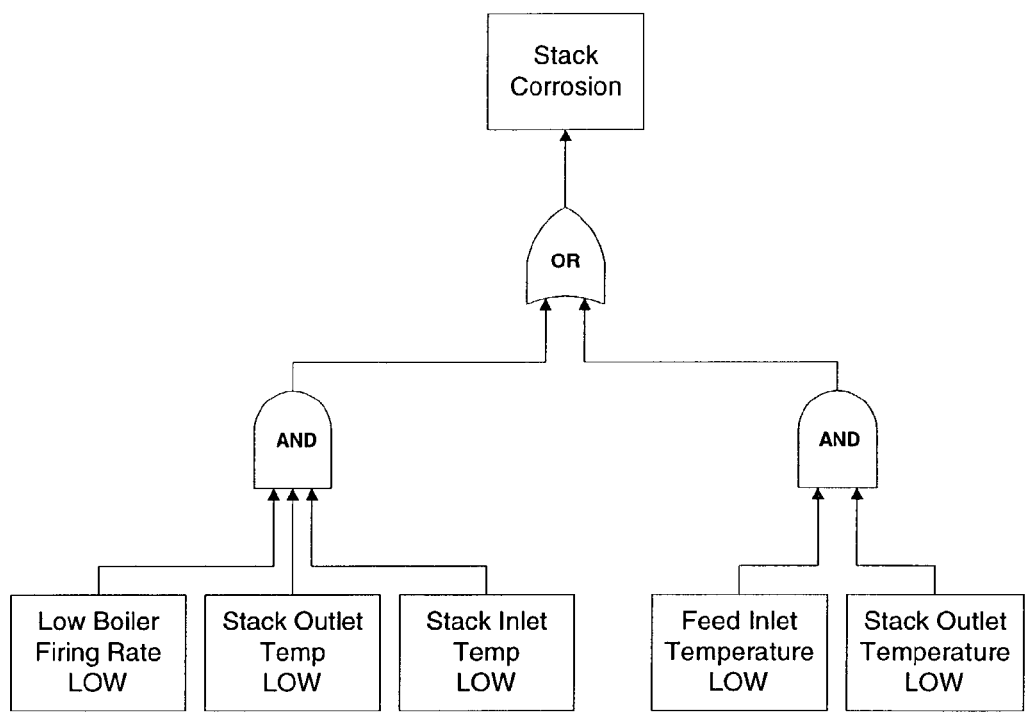
Figure 12c. Example Design-Basis Diagnostic

Figure 13. Example of Diagnostic Information

| | | |
|---|---|---|
| PROBLEM: | Boiler Tube Fouling | |
| INDICATORS: | Calorimetric efficiency low; stack gas inlet temperature high | |
| IMPACT: | Reduced efficiency | |
| LIKELY CAUSES: | 1. External fouling from incomplete combustion<br>2. Internal fouling from poor water chemistry | |
| CONDITIONS: | | |
| CURRENT: | Stack gas inlet temperature:<br>Calorimetric efficiency: | 390°F<br>74% |
| RECOMMENDED: | Stack gas inlet temperature:<br>Calorimetric efficiency: | > 400°F<br>> 76% |
| CORRECTIVE ACTIONS: | 1. Run soot blowers<br>2. Check soot blowers for satisfactory operation<br>3. Check steam drum water chemistry<br>4. Visually inspect tubes at next shutdown<br>5. If conditions persist, notify management | |

Figure 14a. Asset Manager Module Processing
Asset Manager Processing
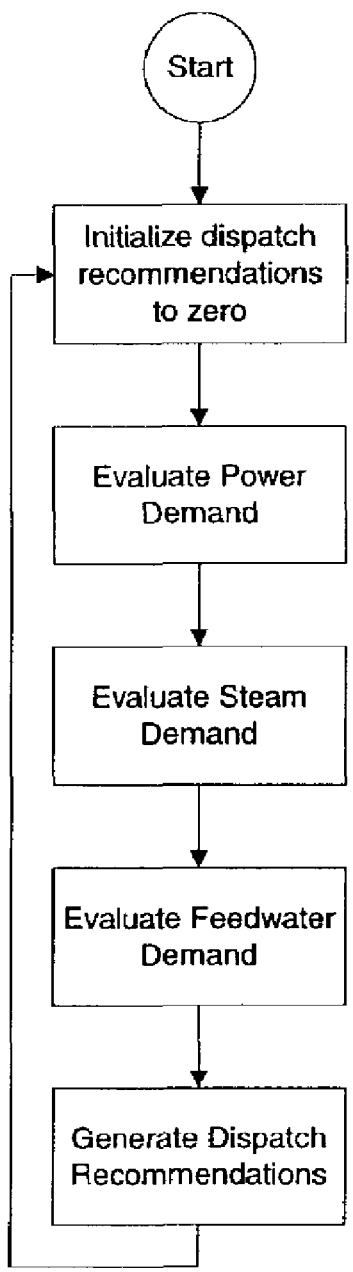

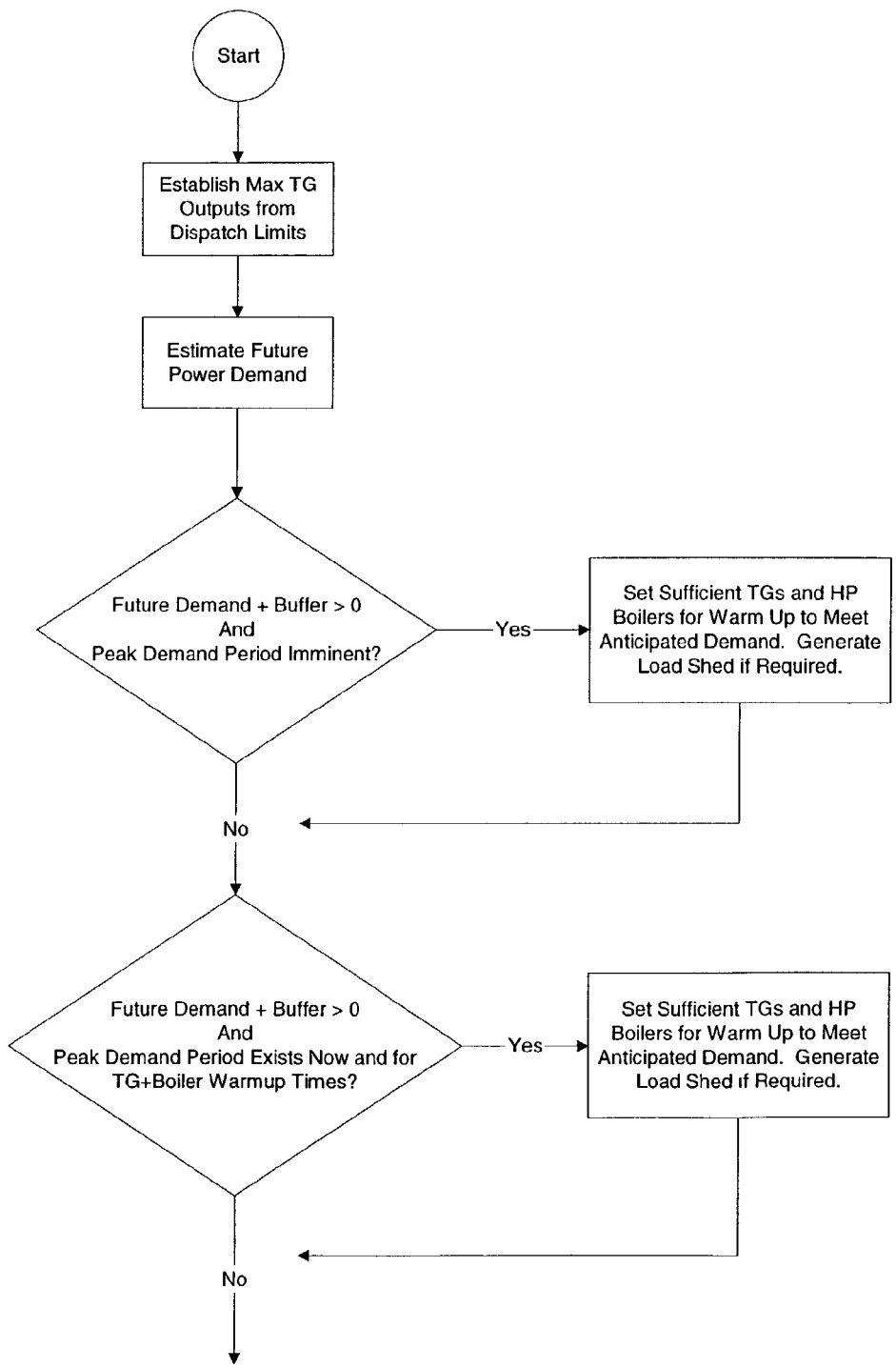
Figure 14b. Asset Manager Module Processing (continued)

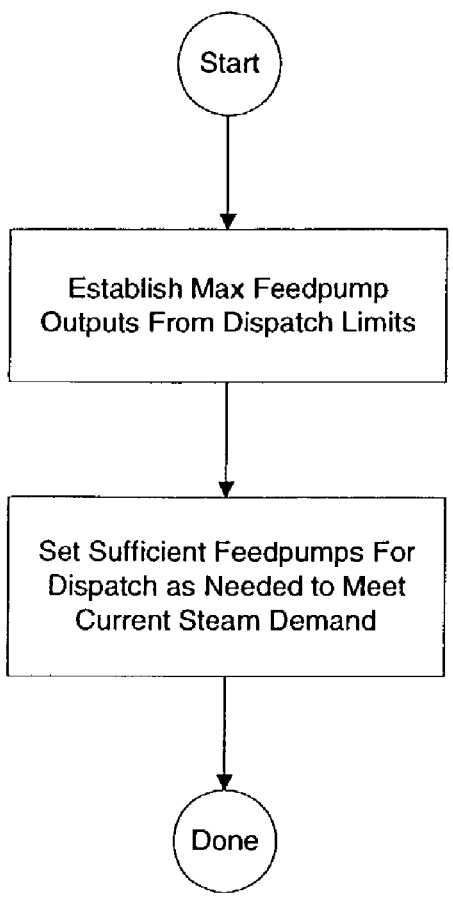
Figure 14e. Asset Manager Module Processing (continued)

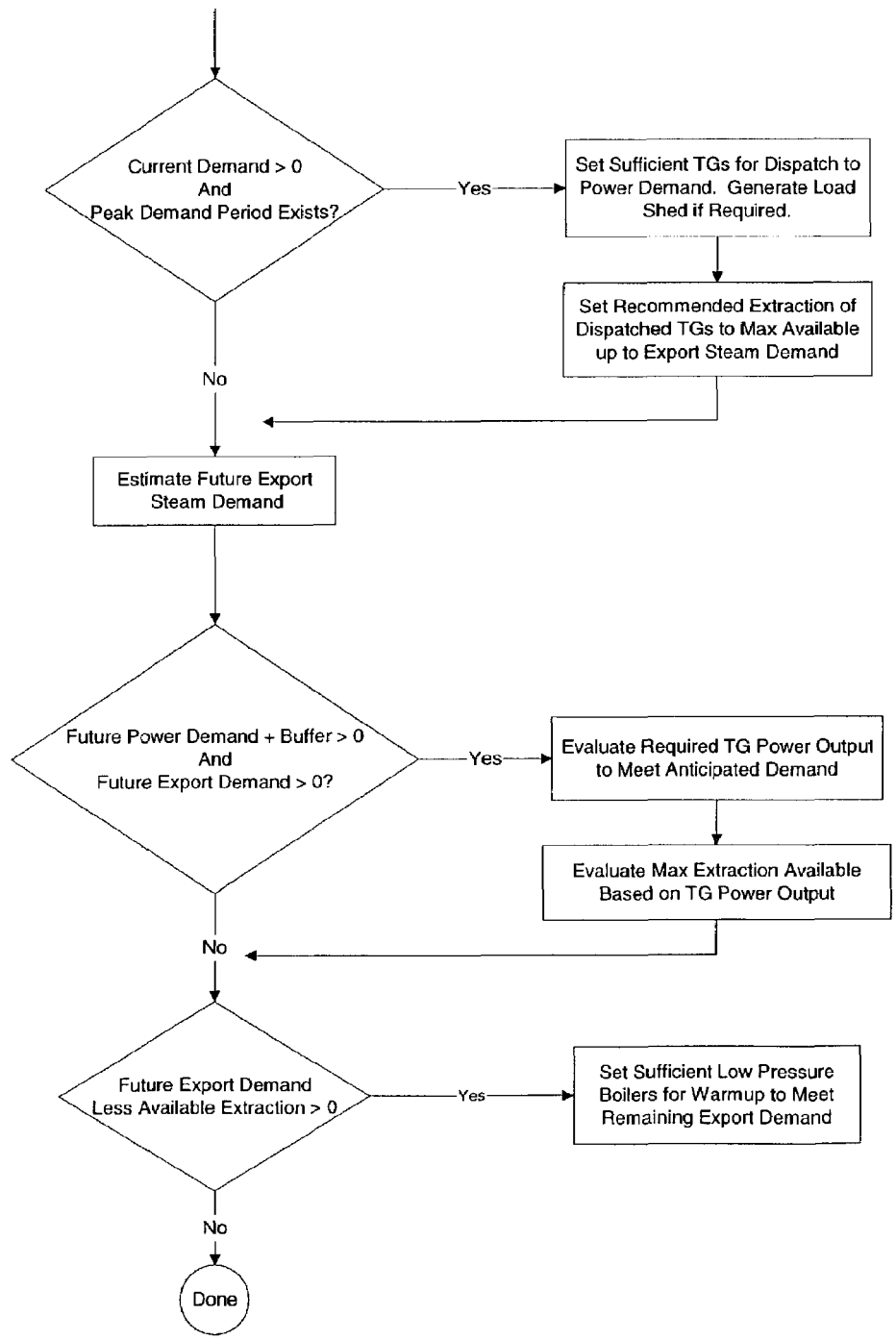
Figure 14c. Asset Manager Module Processing (continued)

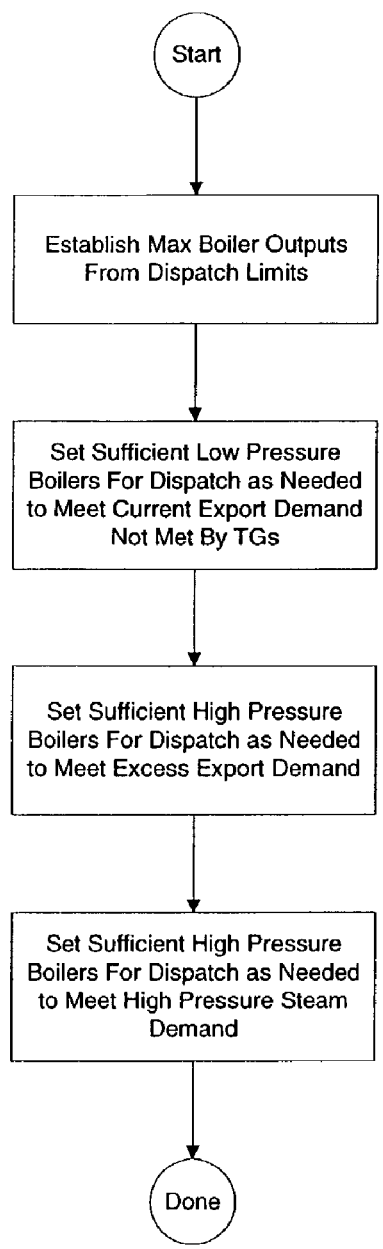
Figure 14d. Asset Manager Module Processing (continued)

DECISION SUPPORT FOR OPERATIONS AND MAINTENANCE (DSOM) SYSTEM

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

CROSS-REFERENCE TO RELATED APPLICATIONS

Not Applicable

BACKGROUND OF THE INVENTION

Virtually all large scale industrial facilities (or "plants") require the regular operation and maintenance of a variety of disparate pieces of equipment. These pieces of equipment may operate independently of one and another, or they may operate in concert. For example, virtually every building in the United States has some form of heating and air conditioning system. In a large building, such as a factory or an office building, several pumps, boilers, fans, heat exchangers and other pieces of equipment are typically employed to maintain the temperature and/or humidity at various locations inside the building at desired levels. Typically, the operations of each of these pieces of equipment affect the desired state of other pieces of equipment, either up or downstream, or in parallel. As an example of an operation up or downstream, a building might have several boilers, each connected to a pump. When any one of the boilers is turned on, the pump might also be required to be turned on. As an example of equipment operating in parallel, it might be the case that when one of the boilers in turned on, one or more of the other boilers may be turned down or off.

The controls for these pieces of equipment may be integrated, such that an when an operator changes the operating state of one piece of equipment, the operating state of other pieces of equipment upstream, downstream, or in parallel, are also automatically changed to compensate. Alternatively, the controls may be separate, such that when the operating state of a piece of equipment is altered, an operator is required to make appropriate adjustments to various pieces of equipment manually. The latter circumstance typically requires a high degree of both skill and familiarity with the equipment on the part of the operator.

While many industrial processes have costs that are uniquely associated with the specific process being run in the facility, two main costs are associated with the operation of equipment in virtually all industrial facilities; energy and labor. Energy costs may be incurred for generating power, purchasing power, or consuming power. Accordingly, energy costs may encompass power purchased off the grid, natural gas, oil, or other fuel sources, and the overall efficiency of the plant can cause energy costs to vary significantly. Labor costs are typically related to both operations and maintenance of the facility. Operators who operate the process at something other than optimal efficiency can greatly increase the costs per desired level of output. Similarly, the maintenance of equipment typically requires skilled personnel who are capable of diagnosing and repairing damage or other kinds of wear that are associated with degradations in performance.

Taken together, a system that can maximize the energy efficiency of a plant while minimizing the labor necessary to maintain efficient operations can result in significant cost savings. Not surprisingly, many systems that seek to automate many of the steps required to maximize energy efficiency or to minimize the required labor have been proposed.

For example, U.S. Pat. No. 5,216,623 to Barrett, et al. issued Jun. 1, 1993 and entitled "System and method for monitoring and analyzing energy characteristics" describes a system for monitoring energy characteristics of an energy consuming system. The '623 system includes a data gathering device that accumulates data representing each of the sensed energy characteristics in real time, the data representing magnitude of the sensed energy characteristic as well as the time at which the magnitude is sensed. The data that is accumulated for each of the sensed energy characteristics is periodically transmitted to a remote analysis station. The remote analysis station performs a detailed analysis of the sensed energy characteristics and generates reports containing summaries of the sensed data in the form of listings of compressed data as well as graphs such as histograms and graphs correlating different energy characteristics of the energy consuming system.

As described by the '623 patent, in order to provide a detailed analysis of the data wherein the analysis is not constrained by any on-site limitations, the accumulated sensor data is periodically transmitted to a remote site. At the remote site means are provided to convert the raw accumulated sensor data into standard units of measure so that it can be displayed or printed in a meaningful manner. The data from various sensors is also combined at the remote site to derive data representing additional energy characteristics of the energy consuming system. The '623 patent does contemplate on-site analysis, however, the '623 patent describes as preferred the analysis of the data as occurring off-site. Further, the data from various types of sensors is described as being "statistically correlated at the remote site so that relationships between energy characteristics may be obtained."

The '623 patent thus suffers from several drawbacks, and presents a less than complete solution to the goal of maximizing energy efficiency of a plant while minimizing the required labor. While the '623 patent describes a method for automating the collection of data, it does not perform analysis of the data, or of identifying the optimal operating conditions for the process.

U.S. Pat. No. 6,278,899 to Piche, et al. issued Aug. 21, 2001 and entitled "Method for on-line optimization of a plant" describes another system using an on-line optimizer for optimization of the operation of a plant with respect to predetermined operating parameters. The '899 patent describes an optimizer including a steady state optimizer for modeling the operation of the plant and for receiving target plant output values and optimization criteria for generating plant input values that are optimized in accordance with the optimization criteria and with respect to predetermined operating parameters. A nonlinear dynamic model is provided for modeling the operation of the plant and providing estimated plant output values that constitute predicted values of the plant outputs. An analyzer measures the real time and actual plant outputs during operation thereof. A difference device then measures the difference between the estimated output of the nonlinear dynamic model and the output of the difference circuit as bias value. This offset value is then applied to an offset device for offsetting the operation of the steady state optimizer by the bias value during on-line operation of the plant.

The method of the '899 patent is shown using the operation of a boiler as an example. As described in '899, this includes the step of measuring the inputs and the outputs of the plant and then mapping a defined plurality of the measured inputs through a predetermined relationship that defines a desired operating parameter of the plant based upon said defined plurality of the measured inputs to intermediate inputs numbering less than the defined plurality of the measured inputs. The intermediate inputs and the inputs not in said defined plurality of the measured inputs are processed through a steady state optimizer to provide optimized intermediate input values for the intermediate inputs and optimized inputs not in the defined plurality of the measured inputs. The optimized intermediate input values are mapped through an inverse of the predetermined relationship to provide an optimized defined plurality of inputs corresponding to the defined plurality of the measured inputs. The optimized defined plurality of inputs and the optimized inputs not in the defined plurality of the measured inputs are then applied to the plant.

The '899 patent thus suffers from the drawback that it is limited to optimizing inputs. Thus, it is unable to analyze the cause of abnormal operations, such as is required for preventative maintenance and repairs.

U.S. Pat. No. 6,366,889 to Zaloom issued Apr. 2, 2002 entitled "Optimizing operational efficiency and reducing costs of major energy system at large facilities" describes a computer implemented system and method for enhancing the operational efficiency of major energy consuming systems at large facilities. The system and method allows for visually analyzing current and historic patterns of energy consumption in a facility (such as electricity, gas, steam, water or other energy) to determine the presence of possible operating errors, equipment problems, or hard-to-detect billing errors. An important step of the method is creating documented patterns representing unusual circumstances which could represent inefficient operation of the facility, for which solutions are known based on analysis of energy consumption by several large facilities over long periods, to allow identification of the nature of similarly inefficient facility operation as shown in the graphs produced by the disclosed method and to allow identification of possible solutions.

While the '889 patent seeks to solve many of the same problems of the present invention, it does so in a decidedly less sophisticated and less detailed manner. The '889 patent tracks inefficiencies in energy consumption within a facility over multiple periods, and then creates "documented patterns representing unusual circumstances which could represent inefficient operation of the facility, for which solutions are known based on analysis of energy consumption by several large facilities over long periods, to allow identification of the nature of similarly inefficient facility operation as shown in the graphs produced by the system to allow identification of possible solutions." Accordingly, the '889 patent still requires skilled operations and maintenance personnel who are capable of interpreting the patterns to identify possible solutions.

U.S. Pat. No. 5,061,916 to French, et al. issued Oct. 29, 1991 entitled "Event driven remote graphical reporting of building automation system parameters" describes a system and method for reporting of alarms (or other conditions) to a remote location, in a building automation system. The alarm is reported in graphical format which shows not only the information related directly to the alarm, but also additional information, including graphical information, intended to put the alarm in context. The system provides the user the ability to specify a transmittable alarm, and to define a graphical message for that alarm which includes fixed or static building parameters associated with real time building operating parameters. Upon occurrence of an alarm condition, the system assembles a graphical display for transmission which includes the specified fixed parameters and measured data for the real time operating parameters. The system assures that data is collected and assembled into the graphic display for all specified real time operating parameters, then initiates a facsimile transmission of the graphic display to a remote location.

The '916 patent thus describes a highly detailed alarm system, but while the triggers in the '916 patent alert an operator to component failures, the '916 patent fails to provide any means for analyzing the operating condition of a system, and instead replies on a skilled operator for that function.

U.S. Pat. No. 6,216,956 to Ehlers, et al. issued Apr. 17, 2001 entitled "Environmental condition control and energy management system and method" describes an indoor environmental condition control and energy management system that includes a plurality of inputs. As described by the '956 patent, a user input receives user input parameters including a desired indoor environmental condition range for at least one energy unit price point. An indoor environmental condition input receives a sensed indoor environmental condition. An energy price input receives a schedule of projected energy unit prices per time periods. A processor, coupled to the inputs, computes an environmental condition deadband range for multiple energy unit price points based on the user input parameters and controls at least one energy-consuming load device to maintain the indoor environmental condition within the computed deadband range for a then-current energy unit price point. In an embodiment, the environmental condition includes at least temperature and at least one load device includes a heating and cooling system. The processor, in one embodiment, communicates through a communications link with at least one energy supply company and selects one energy supply company for a premise to minimize energy consumption cost.

While the '956 patent does disclose methods for analyzing and balancing loads to improve efficiency, it does so in a manner that still requires skilled operator and maintenance personnel to monitor and analyze the system. For example, the '956 patent describes its approach as follows: "To illustrate this point, water may be heated in a dual fuel water heater using either gas or electricity as a direct energy unit source. Water may also be heated using a heat recovery system attached to the air heating and cooling system. The system will have the ability to perform the necessary economic modeling to determine if water should be heated directly using the cheapest form of energy unit available (i.e. electricity or gas), or by operating the heating and cooling system, or a combination of the two."

Accordingly, the '956 patent does not measure the parameters necessary to characterize the actual operating condition of the process, or provide any automated analysis of the actual operating condition.

U.S. Pat. No. 5,159,562 to Putman, et al. issued Oct. 27, 1992 entitled "Optimization of a plurality of multiple-fuel fired boilers using iterated linear programming" describes a method for optimizing control of a process having interdependent operating conditions determined by a control unit, by defining relationships between the operating conditions, all constraints on the process and a process variable to be optimized, in a linear programming matrix; assigning initial values to matrix elements in the liner programming matrix; executing a computer program to solve the linear programming matrix; modifying selected matrix elements representing a set of the operating conditions according to a test strategy and adjusting any unselected matrix elements that require change due to the modifying; executing the computer program to produce a solution of the linear programming matrix after completing the modifying; repeating the modifying and executing of the computer program on the modified linear programming matrix for each test defined by the test strategy until convergence of the solution of the linear programming matrix; and adjusting the control unit to establish the operating conditions indicated by the solution of the linear programming matrix resulting at the convergence.

An example of the '562 patent is shown by optimizing the production of steam and electricity by a system having a gas turbo generator, a steam generator and a heat recovery steam generator. In this application, the '562 patent describes the linear programming matrix as including energy balance equations for the system. The selected matrix elements are modified by calculating first values representing a first steady state model based on the initial solution of the linear programming matrix and second values representing a second steady state model based upon slight modifications to the initial solution. The first values are assigned to the selected matrix elements representing the first steady state model and local linear models determined as a function of the assignment made by the first steady state model are assigned to the selected matrix elements which represent effects of change from conditions in the first steady state model. The modification and execution steps are repeated until an accurate model is being used for the system to produce steam and electricity with optimal settings.

As described by the '562 patent, optimum operating conditions are calculated in an iterative fashion by solving a matrix of linear equations that take into account such variables as fuel cost, fuel efficiency, and the like. Thus, the '562 patent relies on the solution from a matrix of linear equations to correct variances from an optimal level, and thus relies on skilled maintenance and operations personnel to determine the logical structures specific to particular devices and best engineering practices.

Thus, there remains a need for a system that can reduce the costs associated with the operation of equipment in an industrial facility by automating the process of determining the level of operations for optimal efficiency and by automating the process of diagnosing damage or other kinds of wear that are associated with degradations in performance.

BRIEF SUMMARY OF THE INVENTION

Accordingly, it is an object of the present invention to provide a method for minimizing the life cycle cost of processes, particularly industrial processes. While a preferred embodiment of the present invention herein describes the method as it might be applied to the heating of a building, those having ordinary skill in the art will recognize that the method of the present invention is not limited to a heating system, and may be successfully deployed across a wide variety of industrial processes. While not meant to be limiting, processes for which the present invention would provide an economic benefit include high safety consequence processes, such as nuclear processes, e.g. nuclear electrical power generating plants, nuclear waste vitrification and packaging plants, nuclear fuel manufacturing and reprocessing facilities, chemical processes, special chemical manufacturing involving carcinogens or pesticides), general chemical manufacture (e.g., fertilizer, plastics, pharmaceuticals), and petroleum refining; high energy consumption processes, such as aluminum smelting and steel production; high material and/or machinery consumption processes, such as automobile manufacturing, food preparation, and heating and cooling; and high skill level requirements processes such as microchip manufacturing, machining processes, fossil fuel electrical generation, and combined heat and power installations. Accordingly, the method of the present invention is broadly applicable to any process that utilizes a variety of disparate pieces of equipment which are operated independently of one and another or in concert. Thus, while the present invention is described in highly specific detail using the heating of a building as an example, the invention should be broadly construed to encompass any process utilizing pumps, boilers, fans, heat exchangers, chillers, fans, solid oxide fuel cell stacks, rooftop package units, HVAC systems, pumps, motors, and defouling monitors and equipment, or other pieces of similar or complementary equipment.

The present invention thus performs a series of automated steps, the objects of which are designed to provide meaningful information to optimize the operation and maintenance of a process in a manner which allows the minimization of its overall life cycle cost. Toward that end, the first object of the present invention is to identify a set of optimal operating conditions for the process.

It is then a further object of the present invention to identify and measure parameters necessary to characterize the actual operating condition of the process.

It is then a further object of the present invention to validate data generated by measuring those parameters.

It is then a further object of the present invention to characterize the actual condition of the process using the data.

It is then a further object of the present invention to identify an optimal operating condition for the process corresponding to the actual condition It is then a further object of the present invention to compare the optimal condition with the actual condition and identify variances between the two.

It is then a further object of the present invention to draw from a set of pre-defined algorithms an explanation of at least one likely source and at least one recommended remedial action for selected variances.

It is then a further object of the present invention to provide the explanation as an output to at least one user.

It is then a further object of the present invention to select optimal and actual operating conditions from the group consisting of conditions relating to a plant, conditions relating to a building, and combinations thereof.

It is then a further object of the present invention to select the set of optimal and actual operating conditions relating to the plant from the group consisting of conditions relating to at least one boiler, conditions relating to the balance of the plant, conditions relating to at least one turbine, and combinations thereof.

It is then a further object of the present invention to select diagnostic functions of predefined algorithms for variances between conditions relating to the boiler from the group consisting of the identification of boiler tube fouling, a boiler tube leak, a boiler water level control malfunction, a burner nozzle or firing rate control malfunction, excessive fire box heat loss, an economizer tube fouling, an economizer tube leak, an induced draft fan problem, a forced draft fan problem, stack condensation, a steam drum water level control malfunction, over firing, and combinations thereof.

It is then a further object of the present invention to select a diagnostic function of a predefined algorithm for variances between conditions relating to the balance of the plant as the identification of a high pressure steam leak.

It is then a further object of the present invention to select diagnostic functions of predefined algorithms for variances between conditions relating to the turbine from the group consisting of identification of a salt water cooling problem, a loss of condenser vacuum, condenser tube fouling, a turbine condensate control problem, and combinations thereof.

It is then a further object of the present invention to select the set of optimal and actual operating conditions relating to the building from the group consisting of conditions relating to space heating, conditions relating to hot water generation, and combinations thereof.

It is then a further object of the present invention to select diagnostic functions of predefined algorithms for variances between conditions relating to space heating from the group consisting of identification of a space heating system fault, building heat loss, a zone valve malfunction, and combinations thereof.

It is then a further object of the present invention to select diagnostic functions of predefined algorithms for variances between conditions relating to hot water generation from the group consisting of identification of high domestic hot water energy use, air or water binding in domestic hot water tank coils, domestic hot water tank coil failure, and combinations thereof.

These and other objects of the present invention are satisfied by providing the comprehensive system of the present invention that both monitors and optimizes a process by utilizing a library of algorithms constructed according to best engineering practices, the out put of those algorithms being tied to specific functions, such as engineering, maintenance, operations, etc. to allow optimal operation, maintenance and repair of the process. It should be noted that in many cases, while the library of algorithms are applicable to specific pieces of equipment, they are not constructed in a manner that renders them vender specific. Rather, the algorithms are generalized to allow the system to be rapidly and inexpensively implemented in a variety of installations that use equipment having the same or similar functions produced by a variety of manufacturers and configured in a variety of ways at a specific location. While this flexibility of the present invention can be readily appreciated with an understanding of a detailed description of a preferred embodiment, it will be apparent to those skilled in the art that many changes and modifications may be made without departing from the invention in its broader aspects. The appended claims are therefore intended to cover all such changes and modifications as fall within the true spirit and scope of the invention.

BRIEF DESCRIPTION OF THE SEVERAL VIEWS OF THE DRAWING

FIG. 1 is a diagram showing the operations and maintenance functional interactions taught by the present invention.

FIG. 2 is a diagram showing the operations and maintenance functional interactions shown in FIG. 1 further partitioned to specific task levels.

FIG. 3 is a diagram showing a preferred embodiment of the present invention wherein the system operates in a networked environment with a central server providing coordination and management of information flow and storage, and further showing that a multi-plant configuration can be performance monitored using web access at a remote location.

FIG. 4 is a diagram of the overall DSOM computing architecture, including commercial, off the shelf (COTS) components. The COTS may include a computerized maintenance management system (CMMS), a database management system (DBMS), a graphical user interface (GUI) for display of data, and other data analysis software that can benefit from data and information provided by DSOM.

FIG. 5 is a diagram showing the data flow within the System Supervisor of a preferred embodiment of the present invention.

FIG. 6 is a diagram showing the data flow within the Data Management module of the System Supervisor of a preferred embodiment of the present invention.

FIG. 7 is a diagram showing the complete object model of a preferred embodiment of the present invention.

FIG. 8a is a diagram showing the object model of operations class objects of a preferred embodiment of the present invention.

FIG. 8b is a diagram showing the object model of facility class objects, within the class of operations objects, of a preferred embodiment of the present invention.

FIG. 8c is a diagram showing the object model of plant class objects, within the class of operations objects, of a preferred embodiment of the present invention.

FIG. 8d is a diagram showing the object model of building class objects, within the class of operations objects, of a preferred embodiment of the present invention.

FIG. 8e is a diagram showing the object model of station class objects, within the class of operations objects, of a preferred embodiment of the present invention.

FIG. 8f is a diagram showing the object model of system class objects, within the class of operations objects, of a preferred embodiment of the present invention.

FIG. 8g is a diagram showing the object model of specialized system class objects, within the class of operations objects, of a preferred embodiment of the present invention.

FIG. 9 is a diagram showing the object model of component class objects of a preferred embodiment of the present invention.

FIG. 10a is a diagram showing the object model of sensor class objects of a preferred embodiment of the present invention.

FIG. 10b is a diagram showing the object model of specialized sensor class objects of a preferred embodiment of the present invention.

FIG. 11 is a diagram showing the object model of external object class objects of a preferred embodiment of the present invention.

FIG. 12a is a diagram showing a design-basis diagnostic, boiler tube fouling, as an example of a preferred embodiment of the present invention.

FIG. 12b is a diagram showing a design-basis diagnostic, burner nozzle or firing rate malfunction, as an example of a preferred embodiment of the present invention.

FIG. 12c is a diagram showing a design-basis diagnostic, stack corrosion, as an example of a preferred embodiment of the present invention.

FIG. 13 depicts the format and content of diagnostic information output by the diagnostic algorithms as an example of a preferred embodiment of the present invention.

FIG. 14a is a diagram showing the processing of the Asset Manager Module in a preferred embodiment of the present invention.

FIG. 14b is a diagram showing a portion of the processing of the power demand evaluation function of the Asset Manager Module in a preferred embodiment of the present invention.

FIG. 14c is a diagram showing the remainder of the processing of the power demand evaluation function of the Asset Manager Module in a preferred embodiment of the present invention.

FIG. 14d is a diagram showing the processing of the steam demand evaluation function of the Asset Manager Module in a preferred embodiment of the present invention.

FIG. 14e is a diagram showing the processing of the feed water demand evaluation function of the Asset Manager Module in a preferred embodiment of the present invention.

DETAILED DESCRIPTION OF THE INVENTION

A preferred embodiment of the present invention has been reduced to practice as a software system called the "Decision Support for Operations and Maintenance" or "DSOM®." DSOM has been registered as a trademark and servicemark owned by the Battelle Memorial Institute. DSOM was designed to provide process operations and maintenance (O&M) personnel with understandable information for making safe, cost-effective life-cycle operating decisions. The DSOM software system provides process operators—and potentially maintenance technicians, engineering staff and administrators—on-line, user-specific information, status and predicted condition states about process operating conditions and performance, thereby providing early warning signs of degraded performance. An adjustable alert and alarm band monitor (Green Band Concept—FIG. 15) is provided for all primary (direct sensor) data as well as virtual (computed) sensor outputs. Alert bands (yellow) are assigned based on optimizing process efficiency and extending equipment lifetime. Alarm bands (red) are defined by the design basis limits of the equipment they relate to. Prognostics on predictions for a time-to-design-limit are provided to the operator when an alert band is encountered. This prediction is based on the slope of the monitored parameter as it traverses the alert band.

The information provided by DSOM to the various users of the system, each typically representing different disciplines or roles within the organization, is provided in a format commensurate with the interests of the user (see FIG. 16). For example, process operators are provided current data on process characteristics, maintenance staff are provided data on failing or damaged equipment, and administrative staff are provided costs of raw material consumption per unit of product delivered.

The DSOM software design is based on a model of facility design that proposes that any process requires five major functions that must work and communicate together to achieve the process goals in an efficient, safe, and cost-effective manner. The major functions that must be accomplished are: operations, maintenance, engineering, training and administration. Operations refers to the manipulation of the process machinery to direct, control, and facilitate the process. Maintenance refers to the upkeep and repair of process components (e.g., equipment). Engineering refers to the direction of process operations and maintenance activities within the context of the predefined specifications and limits (design basis) of the process and process components. Training refers to the definition and instruction of the skills needed for proper process operation and maintenance. Administration refers to the overall management and oversight of operations, maintenance, engineering, and training activities with as dictated by needs process, the resources available, and the goals of the facility.

These five functional areas can be visualized as a pentagram structure shown in FIG. 1. Each of the five essential functions can be further partitioned to specific task levels, as shown in FIG. 2. The performance of a characterization study—a study to evaluate and describe the current quality and efficiency of the process and operations, maintenance, engineering, training, and administration activities—also identifies the optimal operating condition for the process and determines a baseline for comparison analysis. A codified question protocol and attribute ranking scheme has been developed and computer automated to provide a 3-D graphic of the corporate structural effectiveness and need for focusing of managerial resource, as shown in FIG. 17.

Preferably, the DSOM software architecture incorporates a modular design to facilitate the addition of dedicated information structures and interfaces not only for operations, but for maintenance, engineering, training and administration as well. The general information and content for each area is preferably structured as follows:

Operating information may include process parameter data, diagnostics and prognostics on various process components, and recommendations on process procedures, configuration and optimization.

Maintenance information may include a list of process component condition for all components, maintenance status of all major process components, maintenance histories (failures, PMs, PdM info, prognostic status) and spares inventory on major process components, detailed drawings and inspection and repair procedures.

Engineering information may include process condition and performance trends, process piping and instrumentation diagrams (P&IDs) and general process information at a higher level of detail (process point state and design basis for each component).

Training information sets and instructor—student scenario sessions may provide subject material and practice sessions for operator and maintenance proficiency instruction and demonstration.

Administrative information may provide periodic synopsis of financial information related to the cost of operation and maintenance of the process and its components. Information would be presented in a clear and understandable form for assistance in making safe, life-cycle, cost-effective operating decisions based on process component condition status. Requirements for administrative inspection and oversight will also be stipulated here.

Preferably, users associated with each group interact with DSOM through a primarily mouse-driven graphical user interface. The DSOM software system also preferably employs a methodology that facilitates the optimization of process performance, reduction of operating and maintenance costs, and extension of process component life. This is accomplished by the integration of expert engineering knowledge, process characterization data, and process parameter data to provide useful information that at least operations staff—and preferably maintenance, training, engineering, and administrative staff—can readily utilize. Preferably, the DSOM software operates in a networked environment with a central server providing coordination and management of information flow and storage. While not meant to be limiting, an exemplary configuration of such a system is shown in FIG. 3. Each critical function of the DSOM software can also operate as an individual, standalone system (e.g., operations only). Also while not meant to be limiting, the central server may be located in the control room of the process and may perform the core functions of the DSOM system, as well as serving as the interface for the plant operators. Maintenance staff, supervisors, administrators and engineers may access the system using computers located in their respective offices. The training system may operate independent of the other functional aspects of the system.

The DSOM software is thus in communication with a series of sensors allowing continuous analysis of the condition of the process and the process components. These operational sensors may include any and all sensors normally used by those having skill in the art to measure process states, including, but not limited to, temperature, flow, electrical current and voltage, fluid pressures, etc. The DSOM software is preferably configured to accommodate and correlate data with very different sampling rates. For example, temperature may be measured every few seconds and fouling sampling data on an hour or more time interval. These different data rates are accommodated and used in the DSOM diagnostic/prognostic. DSOM is further preferably configured to mix data that monitors both "moving parts" such as rotating machinery, for example a pump, and monitoring of non-moving parts, such as fouling in a heat exchanger, or even structural integrality of a primary pressure vessel or concrete containment in a nuclear power plant. For each parameter a different type of sensor system is employed to provide the data integrated under DSOM. The appropriate selection and configuration of such sensors to monitor and measure parameters relevant to the operation of equipment used in a process to which DSOM may be advantageously applied is well understood by those having skill in the art, and no further explanation of such devices is necessary to enable those having skill in the relevant art to practice the present invention, as the mere configuration and use of such sensors to monitor such equipment is not considered to be a novel aspect of the DSOM software.

To apply the full diagnostic and prognostic features of DSOM, a stressor-specific sensor set is preferably defined that provides insights into operation of the system within its design basis for operation. Stressor intensity beyond the design basis are flagged and tracked by the system and are used to accurately predict failures of critical equipment.

Using information transmitted by operational sensors appropriately configured, the core processing of the DSOM software provides operators with accurate information on the current operating condition of the process. This information may include operating levels, the status of process components (e.g., on, off, degraded, failed), advisories on current process performance, diagnostics on process anomalies, structural integrity and plant condition parameters, e.g. strength and integrity of concrete in a containment, leak detection, motor support breakage from foundation, cracking and crack growth, process conditions such as water chemistry that impact corrosion, fouling etc. and recommendations on current and future process component configuration. Maintenance staff may have access to maintenance and repair records on process components and access to the computerized maintenance workpackage status. Engineering staff may have access to more detailed information on process operation and condition status. Process condition and performance diagnostics may be available to all users in a format tailored to their needs.

Preferably, the DSOM software system consists of software as described herein that is integrated with commercial off-the-shelf software (COTS) to provided greater overall utility. The overall DSOM system, including COTS components, is depicted in FIG. 4. The COTS may include the computerized maintenance management system (CMMS), a database management system (DBMS), graphical user interface (GUI) for display of data, and other data analysis software that can benefit from data provided by DSOM.

The DSOM software is preferably constructed using a modular, scalable architecture thereby permitting cost-effective increases in functionality, and accommodating physical systems of various size, configuration, and complexity. Common computer functionality sets may be grouped and isolated as separate entities, or modules, with precisely defined input/output requirements. The construction of the modules is such that internal failures of an individual module may not preclude the operation of the remaining system.

As shown in FIG. 4, the preferred embodiment of the DSOM software system is a modular application consisting of the System Supervisor, OLE for Process Control (OPC) Server Module, Sensor Validation Module, Asset Management Module, Diagnostic/Prognostic Module, and the Data Acquisition and Control Interface. The System Supervisor provides interfacing and execution control for the remaining modules as well as internal data management. The OPC Server Interface provides for data transfer between the DSOM software system and other external independent systems, preferably using OPC-compliant mechanisms. The Sensor Validation Module may evaluate and qualify process parameter data before it is used by the system. The Asset Management Module monitors process demand and recommends the most optimum configurations for process components to satisfy the demand. The Diagnostic Module performs process component-level diagnostics and prognostics. The Data Acquisition and Control Interface manages data transfer between the data acquisition and control hardware and the internal functions of the DSOM software system.

The System Supervisor initiates data acquisition, sensor validation, diagnostic, and data archiving algorithms. Preferably, these algorithms proceed independently but cooperatively and in synchronization. In addition, the system supervisor initializes complex data structures and the interfaces to the database, and data acquisition system (DAS). The system supervisor also transfers data to and from the DAS, database, and external systems (via the OPC server module). In summary, the System Supervisor performs the various integrating and control functions necessary for proper interaction and synchronization of the specialized modules by integrating supporting diagnostic and interface modules, managing the transfer of data between the modules and the database including management of complex data structures, and implementing and managing communications with the OPC server module.

The data flow within the System Supervisor is depicted in FIG. 5. Definitions for the data elements are provided in Table 1.

TABLE 1

Data Element Definitions

| Data Element | Definition |
| --- | --- |
| Alarms | High priority notifications. |
| Alerts | Low priority notifications. |
| asset_diagnostic_notifications | Notifications indicative of nonoptimal configuration of process components (e.g., inefficient operation). See alarms and alerts. |
| Baselines | A general element representing all performance metrics for operation (e.g., turbine heat rates, boiler efficiencies, etc.). These are determined from characterization. |
| boiler_efficiency_baselines | Established boiler efficiency baselines (thermal) used to perform diagnostic evaluations. These are determined from characterization. |
| boiler_requirements | Requirements for boiler operation based on current and future plant demand. |
| condition | A general element representing all data describing the current or most recent operational state of the facility as indicated by DSOM object attributes. This element includes sensor values, system values, alarm events, etc. |
| configurations | A general element representing a total plant description obtained from the database. The configuration data describes systems, sensors, components, etc. |
| control_requests | Outputs to external control systems or actuators by DSOM. |
| diagnostic_notifications | Alarms, alerts, and other diagnostic information generated by the diagnostic functions. |
| DSOM_settings | Internal DSOM settings including DSOM object attributes. |
| efficiency_alerts | Low priority notifications warning of poor efficiency. |
| feed_water_reqs | Current and future feed water requirements based on the recommended current and future boiler configuration. |
| modified_DSOM_settings | Internal DSOM settings, including DSOM object attributes, modified by an external system. |
| new_condition | A general element representing all data describing the new condition of the facility in terms of DSOM object attributes. This element includes sensor values, system values, statuses, etc. |
| notifications | A general element representing any attention requirement (alarm or alert) generated by the software or an update of an existing notification. This element could include the time of the notification, the type of notification (e.g., component failure, non-optimal system operation), the priority (e.g., high priority, low priority), and a pointer to a diagnostic entry in the database. See diagnostics. |
| parsed_configurations | Data describing the configuration information that has been converted from the database format to the format required by the software. |
| plant_configuration | A general element representing the desired and actual active components of the plant. |
| preval_notifications | Notifications indicative of failures of raw sensor and distribution data identified during the prevalidation process. See alarms and alerts. |
| preval_sensors | Raw sensor values that have completed preliminary validation. During this phase, the sensor values will be checked against specified range limits. Sensors that have failed the preliminary evaluation will not be evaluated further and will not be used in subsequent processing. |
| raw_sensors | Sensor values obtained from the data acquisition hardware prior to validation. For each sensor, this structure includes a sensor identifier, an element indicating the success or failure of the data acquisition hardware in obtaining a value from the sensor. A time associated with the acquisition of the entire set of sensor values for the time period is also included in the structure. |
| sensor_log_entries | Data to be input to the sensor status log. |
| system_values | A general element containing data the further describes the operation or status of systems in the facility (e.g., efficiencies and statuses). |
| validated_sensors | A general element indicating raw sensor data that has been validated. For each sensor, this element includes a sensor identifier, the validated value or an analytical replacement, and a qualifier indicating the degree of validation. |
| validation_notifications | Notifications indicative of failures of sensors identified during the validation process. See notifications. |

As shown in FIG. 5, the System Supervisor includes a data management function and an OPC server interface function. The data flow of the data management function is shown in FIG. 6. At the core of the data management function are the DSOM data objects. These objects are instantiations of the DSOM object model depicted in FIG. 7. Preferably, the object models are constructed employing the Object Modeling Technique introduced in *Object-Oriented Modeling and Design*. James Rumbaugh, Michael Blaha, William Premerlani, Frederick Eddy, William Lorensen. Prentice Hall, 1991. ISBN 0-13-629841-9, the entire contents of which are incorporated herein by this reference.

The DSOM object model can be partitioned into two realms, each representing one of the two different aspects of an installation. The two realms are related by a site object superclass that generalizes all entities in an installation. The first realm is based on two classes: component and sensor. Additional classes are possible including a controller class to represent systems that perform control functions with respect to the process. These classes represent all the physical entities that are related to a process. These are the items with which the personnel managing the process understand and interact. The second realm is based on five primary classes: plant, building, system, station, and state. The first four of these classes are related by an operations superclass. These classes combine to represent, in an abstract sense, the entities containing, using, initiating, managing, and otherwise facilitating the conduct of the process.

The operations classes are depicted in FIG. 8. The plant class represents the physical entity containing the process of interest and all its components. Typically, there will only be one plant object of concern but the possibility exists that a number of regionally or functionally related plant objects will be of interest. Plant class objects can be manipulated to determine the overall performance of the process contained within, e.g., overall efficiency. The building class represents physical entities external to the plant that are consumers of process output. The facility class generalizes the plant and building classes. The system class objects represent all the systems of interest within the process that contribute to the main function of the process, for example, and not meant to be limiting, the boiler system, the feedwater system, the hot water heater, etc.

A system may further contain subsystems. Some collections of systems of similar type are referred to as stations. The station class can be further specialized into types of stations. For example, in a heating process it is typical to have a boiler station and a turbine/generator station, etc.). Some components, systems, and stations are only relevant to certain types of facilities. Boilers, turbine generators, and feed pump systems and stations as well as associated components are only relevant for plant facilities. Plant, building, station, and system objects will typically have one or more associated performance metrics, for example efficiency and heat rate.

Component objects are entities that interact to perform the process (process components) or consume process output. The object model for Component objects is depicted in FIG. 9. These objects can correspond to actual pieces of equipment like boilers, pumps, and motors. Component objects can also include abstractions related to actual pieces of equipment such as composite of two or more components, for example, and not meant to be limiting, a pump and motor combination. Components can be associated with zero or one operations object (i.e., a station, boiler system, etc.) containing the component. As indicated, component objects can be aggregates of subcomponents.

Sensors are entities that provide process parameter data. Sensors indicate flows, pressures, and temperature, etc. This object model is depicted in FIG. 10. Zero or more sensors can be associated with a component. These sensors are typically those attached on or near the component and are used to monitor the operation or performance of the component. Sensors can be further specialized into derived sensors and primary sensors. Primary sensors have one physical counterpart (an actual transmitter/sensor pair) in the facility. Site sensor objects represent these physical counterparts. Site actuators represent elements in the facility that can be manipulated by the DSOM controller objects discussed below. These external elements are depicted in FIG. 11. Derived sensors are sensors whose values are derived from one or more input sensors, as dictated by the transformation attribute. The input sensors can be primary or derived sensors. Sensors may be associated with a state as discussed below.

States represent the conditions at the inputs and outputs of operations objects. States are collections sensors and are typically associated with a specific physical location, for example, and not meant to be limiting, the feedwater input to the boiler. State objects are used to provide information on the current input and output conditions of an operations object. States have one or more sensors associated with them.

The DSOM software system as configured above thus performs the following functions or method steps on a periodic basis in the order presented below:

1) Acquire process parameter data
2) Validate process parameter data
3) Determine process and process component performance
4) Evaluate process and process component performance and configuration
5) Present process parameter data and advise users of process and process component performance and configuration evaluations Sensors installed in the process measure parameters that characterize the operating condition of the process and process components. Data acquisition hardware generates data compatible with the DSOM system from the measured parameter data. Failure of a sensor or of a sensor's interface to the data acquisition hardware can prevent generation of data and transfer of the data to the software. The success or failure of generation or transfer of the data is recorded. Also, the time at which the acquisition of all parameter values is completed is recorded. The success or failure and the time are retained with the set of data recorded for the sample period.

Process parameter data obtained by the DSOM system is validated prior to use by the remaining functions. The validation process determines if data are correct. Preferably, but not meant to be limiting, this validation is based on a variety of methods including, but not limited to predefined specifications of the data, comparisons between data elements, and comparisons between estimated data determined from stochastic and analytical calculations. During the validation process, data is preferably qualified as to the results of the validation. Data elements are identified as valid, valid but outside acceptable limits, out of expected range and therefore invalid, useable but excessively variant, or unusable. The value of an unusable data element can then either be replaced by an analytical estimate or if the analytical value cannot be generated, a note may be made that the data element is irreplaceable. Alarms are generated, if appropriate, to indicate problematic data. Alarms and validation results and validated data can be saved to the database for future reference.

The performance of the process and process components are then evaluated based on validated process parameter data, previously acquired data (parametric history), and baseline performance specifications. Performance evaluations include determining operating efficiency and comparing components' current physical condition to predefined baseline condition.

Process performance is then compared against a predefined baseline performance. The performance can be classified as either normal, acceptable but inefficient and/or not desirable, or unacceptable and/or unsafe. Process and process component performance is also evaluated using rule-based algorithms containing any number of decision steps. These algorithms, termed design-basis diagnostics, are derived from engineering expertise and can be tailored specifically to the process while preserving the generic methodology of definition and execution. The design-basis diagnostics identify abnormalities in the process and utilize various characteristics of process parameter data including, but not limited to, rate of change, value relative to acceptable limits, on and off status of binary data, and process component operating state (on, off, etc.). Individual process parameter data characteristics are combined using logical operators to make increasingly complex decisions. Table 2 lists a preferred group of design-basis diagnostics. As will be recognized by those having skill in the art, the list in table 2 is neither an exhaustive listing, nor is it a minimum listing. Rather, it provides a listing of a preferred embodiment of the present invention, and those having ordinary skill in the art will readily appreciate that the list may be expanded or contracted without departing from the spirit of the invention in its broader aspects. Those of ordinary skill in the art will further recognize that several approaches for the specific decisions for each diagnostic are possible, and the selection of particular details for such approaches also should not be viewed as departing from the spirit of the invention in its broader aspects.

For example, FIGS. 12a, 12b, and 12c depict three examples of design-basis diagnostics; boiler tube fouling, burner nozzle or firing rate malfunction, and stack corrosion. While these examples show the decision criteria using reliable engineering data, the exact details of the algorithms incorporated therein may be modified and still produce the desired result. Whatever algorithm is selected in each of the design-basis diagnostics, information associated with each design-basis diagnostic preferably describes the finding of the diagnostic, the likely causes of the abnormality, the potential consequences of the abnormality if allowed to continue, the conditions that led to the discovery of the abnormality, and possible corrective actions. This information can also include precise procedures for rectifying the abnormality. This information is preferably provided as output to users, although in certain instances, the corrective actions may further be performed automatically by the DSOM system, for example, in circumstances whereby DSOM controls inputs that can be adjusted to correct abnormal situations. FIG. 13 depicts a typical example of the output of this information.

Evaluating the configuration involves comparing current process and process component configuration with current and estimated future demand for process output. The Asset Management Module (AMM) in DSOM performs this function. The AMM in DSOM monitors process demand and recommends the most optimum configurations for process components to satisfy demand. Process demand is the total process output of each type of output. Processes may produce a variety of outputs. Recommendations generated by the AMM are termed dispatch recommendations. For example, and not meant to be limiting, a co-generation facility can produce both steam for heating and electricity. External conditions (e.g., weather, time of day, economic factors) may dictate the present or future value of process output and the cost of production. The AMM recommendations can consider such external conditions when evaluating process demand and configuration.

The methodology of the AMM can be explained using the example of a co-generation facility producing both electricity and low-pressure steam for heating. In such a configuration, process economics dictate that electricity is produced only when the cost of purchasing electricity exceeds the cost of production. This can occur at certain times of the day or year or both. These periods are referred to as peak demand periods. The point at which the cost of procurement and production are equal is called the purchase limit. For high-pressure steam turbines, production of electricity results in additional demand for high-pressure steam. Preferably, the AMM assumes the plant meets low-pressure steam demand using any combination of low-pressure boilers, high-pressure boilers using a pressure reduction valve (PRV), and turbine-generator extraction. Production of steam places demand on water supplied by feedwater pumps. Procurement of steam is typically not an option.

When generation of electricity is determined to be cost effective now or in the near future, the AMM will recommend operators begin warming one or more turbine-generators in preparation for electrical production. The AMM anticipates the demand for electricity and low-pressure steam by a linear estimation based on the rate of change of the electrical and steam demand. In addition, a predefined warm-up buffer provides ample warning to the operator of the approach of the purchase limit. The AMM determines the existing steam generation mode and evaluates the need for transition from low-pressure operation to high-pressure to support turbine generator operation. The selection of units to operate can be based on the historical efficiency, the condition-based availability of a given unit, selected operating preferences entered by the plant superintendent (i.e., the dispatch order), or combinations thereof. The processing of the AMM is depicted in FIG. 14.

The recommendations generated by the AMM are termed dispatch recommendations. The dispatch recommendations result from an analysis of current and future site demand and current plant output. A dispatch recommendation is generated when the Asset Manager determines that unmet demand is occurring or will occur. The dispatch recommendations identifies one or more plant components and/or systems that should be adjusted based on recommended operating conditions and output levels to meet the current or anticipated demand. If the AMM determines electrical demand cannot be met, a recommendation will be generated suggestion that electrical load be shed.

To prevent unnecessary generation and retraction of recommendations due to fluctuating supply and demand, a hysteresis interval is defined for each dispatchable system and component. Alarms are generated when process and/or process component performance or configuration is deemed abnormal. Alarms and performance and configuration data are saved to a database for future reference.

Users preferably interact with the DSOM software using an event driven graphical interface. The interface displays process information in the context of a graphical depiction of the process. The depiction uses easily recognizable icons to indicate process and process component conditions and data. Process component status may be color coded and shown as operating, shutdown, degraded, or inoperable. To simplify interactions, the user's main method of data entry may be a computer mouse with minimal keyboard activity required. Data entry mechanisms may include mouse-selectable icons and menus. The information to be displayed may be distributed among several graphical displays, or windows, arranged in a hierarchical fashion. The hierarchy is typically arranged such that the detail of information increases while the extent of the process depicted decreases as the user descends the hierarchy. The information displayed may depend on the type of user. The user types correspond to the five areas described here above: Operations, Maintenance, Engineering, Training, and Administration. When the type of user is defined (by mouse click), the software may be said to operate in a mode associated with the type of user. Each mode of the user interface is discussed in more detail below.

Operations mode users are typically provided with real-time information on the condition of the process including parameter data, alarms, component degradation rates, and performance. Alarms may be indicated at all levels of the display. Alarms may be generated when degradation in process components is identified or process performance levels degrade. The response of the user to alarms is recorded in the database. Operations mode users may be able to acknowledge alarms and obtain additional information regarding the alarm as well as recommended corrective action. Operations mode users may also be able to obtain the current and previous status of process sensors, the historical behavior of sensor values, and information on previous events. Only operations mode users may be have the capability to acknowledge alarms.

Maintenance mode users may be provided all the capability provided to the operations mode user, except alarm acknowledgement, plus additional functionality. This additional functionality includes access to summarized maintenance condition information on process components and sensors and seamless ties to the computerized maintenance management system (CMMS).

Engineering mode users may be provided all the capability provided to the operations mode user, except alarm acknowledgement, plus additional functionality. This additional functionality may include the ability to view process component specifications and view detailed process operation information Training mode may be conducted on a computer system isolated and independent of the operational computer system. In training mode, the user may utilize a copy of actual software configuration data and process parameter data may be simulated. This may prevent any conflicts and confusion between the operational and training modes of the software.

Administration mode users may be provided with real-time usage and financial information related to process operation and maintenance decisions. This information could be provided in a form compatible with the user's accounting format.

TABLE 2

Design-Basis Diagnostics

| Diagnostic Area | Diagnostic | Description |
| --- | --- | --- |
| Building | | |
| Space Heating | Space Heating System Fault | Heating system pressure differential inconsistent with limit (air in-leakage) |
| | Apartment Building Heat Loss | Excessive energy loss to ambient (based on temperature) |
| | Zone Valve Malfunction | Zone valve position inconsistent with apartment temperatures |
| Hot Water Generation | High Domestic Hot Water Energy Use | Hot water demand high compared to limit |
| | Air or Water Binding in Domestic Hot Water Tank Coils | Vapor formation in tank preventing heat transfer from coil |
| | Domestic Hot Water Tank Coil Failure | Perforated coil tubing allowing water in-leakage |
| Plant | | |
| Boiler | Boiler Tube Fouling | Build up on tubes preventing tube heat transfer |
| | Boiler Tube Leak | Tube wall perforation |
| | Boiler Water Level Control Malfunction | Water level out of operational limit for operational condition |
| | Burner Nozzle or Firing Rate Control Malfunction | Control system or linkage malfunction |
| | Excessive Fire Box Heat Loss | Unaccountable heat loss suspected from loss of boiler insulation |
| | Economizer Tube Fouling | Inadequate heat transfer for temperature-flow conditions |
| | Economizer Tube Leak | Wall perforation in economizer tubing |
| | Induced Draft Fan Problem | Furnace pressure improper due to ID fan |
| | Forced Draft Fan Problem | Furnace pressure improper due to FD fan |
| | Stack Condensation | Stack temperature below condensation point of stack gas (corrosion) |
| | Steam Drum Water Level Control Malfunction | Drum level inconsistent with program level |
| | Over Firing | Boiler being fired at rate above design level |
| Balance of Plant | High-Pressure Steam Leak | Energy loss from HP steam system |
| Turbine | Salt Water Cooling Problem | Inadequate flow in condenser heat rejection |
| | Loss of Condenser Vacuum | Turbine vacuum inconsistent with turbine operating conditions |
| | Condenser Tube | Inadequate heat transfer |

TABLE 2-continued

Design-Basis Diagnostics

| Diagnostic Area | Diagnostic | Description |
| --- | --- | --- |
| | Fouling | due to build up on tubes |
| | Turbine Condensate Flow Control Problem | Water level in turbine hotwell out of normal band (control problem) |

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A computer implemented method for minimizing the life cycle cost of processes comprising the following steps:
   a) identifying a set of optimal operating conditions for the process
   b) identifying and measuring parameters necessary to characterize the actual operating condition of the process,
   c) validating data generated by measuring said parameters,
   d) characterizing the actual condition using said data,
   e) identifying an optimal condition corresponding to the actual condition,
   f) comparing said optimal condition with said actual condition and identifying variances between the two,
   g) drawing from a set of pre-defined algorithms an explanation of at least one likely source and at least one recommended remedial action for selected variances, and
   h) providing said explanation as an output to at least one user.

2. The computer implemented method of claim 1) wherein said process is selected from the group consisting of nuclear processes, nuclear electrical power generating plants, nuclear waste vitrification and packaging plants, nuclear fuel manufacturing and reprocessing facilities, chemical processes, special chemical manufacturing involving carcinogens or pesticides, general chemical manufacture, fertilizer manufacture, plastics manufacture, pharmaceuticals manufacture, petroleum refining, aluminum smelting, steel production, automobile manufacturing, food preparation, heating and cooling, microchip manufacturing, machining processes, fossil fuel electrical generation, and combined heat and power installations.

3. The computer implemented method of claim 1) wherein the set of optimal and actual operating conditions are selected from the group consisting of conditions relating to a plant, conditions relating to a building, and combinations thereof.

4. The computer implemented method of claim 3) wherein the set of optimal and actual operating conditions relating to a plant are selected from the group consisting of conditions relating to at least one boiler, conditions relating to the balance of the plant, conditions relating to at least one turbine, and combinations thereof.

5. The computer implemented method of claim 4) wherein a diagnostic function of the predefined algorithms for variances between conditions relating to at least one boiler are selected from the group consisting of the identification of boiler tube fouling, a boiler tube leak, a boiler water level control malfunction, a burner nozzle or firing rate control malfunction, excessive fire box heat loss, an economizer tube fouling, an economizer tube leak, an induced draft fan problem, a forced draft fan problem, stack condensation, a steam drum water level control malfunction, over firing, and combinations thereof.

6. The computer implemented method of claim 4) wherein a diagnostic function of the predefined algorithms for variances between conditions relating to the balance of the plant is the identification of a high pressure steam leak.

7. The computer implemented method of claim 4) wherein a diagnostic function of the predefined algorithms for variances between conditions relating to at least one turbine are selected from the group consisting of identification of a salt water cooling problem, a loss of condenser vacuum, condenser tube fouling, a turbine condensate control problem, and combinations thereof.

8. The computer implemented method of claim 3) wherein the set of optimal operating and actual conditions relating to the building are selected from the group consisting of conditions relating to space heating, conditions relating to hot water generation, and combinations thereof.

9. The computer implemented method of claim 8) wherein a diagnostic function of the predefined algorithms for variances between conditions relating to space heating are selected from the group consisting of identification of a space heating system fault, building heat loss, a zone valve malfunction, and combinations thereof.

10. The computer implemented method of claim 8) wherein a diagnostic function of the predefined algorithms for variances between conditions relating to hot water generation are selected from the group consisting of identification of high domestic hot water energy use, air or water binding in domestic hot water tank coils, domestic hot water tank coil failure, and combinations thereof.

11. A computer implemented method for minimizing the life cycle cost of the process of heating of a building comprising the following steps:
 a) identifying a set optimal operating conditions for the process of heating the building,
 b) identifying and measuring parameters necessary to characterize the actual operating condition of the process,
 c) validating data generated by measuring said parameters,
 d) characterizing the actual condition using said data,
 e) identifying an optimal condition corresponding to the actual condition.
 f) comparing said optimal condition with said actual condition and identifying variances between the two,
 g) drawing from a set of pre-defined algorithms an explanation of at least one likely source and at least one recommended remedial action for selected variances, and
 h) providing said explanation as an output to at least one user.

12. The computer implemented method of claim 11) wherein the set of optimal and actual operating conditions are selected from the group consisting of conditions relating to a plant, conditions relating to a building, and combinations thereof.

13. The computer implemented method of claim 12) wherein the set of optimal and actual operating conditions relating to a plant are selected from the group consisting of conditions relating to at least one boiler, conditions relating to the balance of the plant, conditions relating to at least one turbine, and combinations thereof.

14. The computer implemented method of claim 13) wherein a diagnostic function of the predefined algorithms for variances between conditions relating to at least one boiler are selected from the group consisting of identification of boiler tube fouling, a boiler tube leak, a boiler water level control malfunction, a burner nozzle or firing rate control malfunction, excessive fire box heat loss, an economizer tube fouling, an economizer tube leak, an induced draft fan problem, a forced draft fan problem, stack condensation, a steam drum water level control malfunction, over firing, and combinations thereof.

15. The computer implemented method of claim 13) wherein a diagnostic function of the predefined algorithms for variances between conditions relating to the balance of the plant is identification of a high pressure steam leak.

16. The computer implemented method of claim 13) wherein a diagnostic function of the predefined algorithms for variances between conditions relating to at least one turbine are selected from the group consisting of identification of a salt water cooling problem, a loss of condenser vacuum, condenser tube fouling, a turbine condensate control problem, and combinations thereof.

17. The computer implemented method of claim 12) wherein the set of optimal operating and actual conditions relating to the building are selected from the group consisting of conditions relating to space heating, conditions relating to hot water generation, and combinations thereof.

18. The computer implemented method of claim 17) wherein a diagnostic function of the predefined algorithms for variances between conditions relating to space heating are selected from the group consisting of identification of a space heating system fault, building heat loss, a zone valve malfunction, and combinations thereof.

19. The computer implemented method of claim 17) wherein a diagnostic function of the predefmned algorithms for variances between conditions relating to hot water generation are selected from the group consisting of identification of high domestic hot water energy use, air or water binding in domestic hot water tank coils, domestic hot water tank coil failure, and combinations thereof.

* * * * *